(12) United States Patent
Kochergin

(10) Patent No.: US 6,934,068 B2
(45) Date of Patent: Aug. 23, 2005

(54) MAGNETIC FIELD AND ELECTRICAL CURRENT VISUALIZATION SYSTEM

(75) Inventor: Vladimir Kochergin, Westerville, OH (US)

(73) Assignee: Lake Shore Cryotronics, Inc., Westerville, OH (US)

( * ) Notice: Subject to any disclaimer, the term of this patent is extended or adjusted under 35 U.S.C. 154(b) by 0 days.

(21) Appl. No.: 10/774,687

(22) Filed: Feb. 10, 2004

(65) Prior Publication Data

US 2004/0218249 A1 Nov. 4, 2004

Related U.S. Application Data

(60) Provisional application No. 60/445,832, filed on Feb. 10, 2003.

(51) Int. Cl.[7] .................................................. G02F 1/09
(52) U.S. Cl. ..................................... 359/280; 359/281
(58) Field of Search ............................ 359/280, 281, 359/282, 283, 238, 239

(56) References Cited

U.S. PATENT DOCUMENTS

| | | | |
|---|---|---|---|
| 4,625,167 A | 11/1986 | Fitzpatrick | 324/235 |
| 5,053,704 A | 10/1991 | Fitzpatrick | 324/235 |
| 5,446,378 A | 8/1995 | Reich et al. | 324/238 |
| 5,583,690 A | 12/1996 | Andrae et al. | 359/484 |
| 5,663,652 A | 9/1997 | Freeman | 324/753 |
| 5,894,220 A | 4/1999 | Wellstood et al. | 324/248 |
| 5,969,517 A | 10/1999 | Rao | 324/96 |
| 6,084,396 A | 7/2000 | Rao | 324/158.1 |
| 6,141,093 A | 10/2000 | Argyle et al. | 356/237.1 |

OTHER PUBLICATIONS

B. Ludescher, et al., "Faraday Low–temperature Microscope for observing Dynamic Magentization processes in Supeconductors" (i.e., Faraday–Tieftemperatur–Mikroskop zur Beobachtung dynamischer Magnetisierungsvorgange in Supraeitern), Laser und Optoelektronik 23 (1991), pp. 54–58.

L.A. Dorosinskii, et al., "Studies of HTSC crystal magnetization features using indicator magnetooptic films with in–plane anisotropy," Physica C 203 (1992), pp 149–156.

M.V. Indenbom, et al., "Direct Study of Magnetic Flux Penetration and Trapping in HTSC," *Physica C* 166 (1990), p. 486–496.

(Continued)

*Primary Examiner*—Timothy Thompson
(74) *Attorney, Agent, or Firm*—Nixon & Vanderhye P.C.

(57) ABSTRACT

Magnetic field and/or electrical current imaging systems utilizing magneto-optical indicator films (MOIF) based on magneto-optical material with in-plane single easy axis type of magnetic anisotropy provide improved magnetic field resolution and dynamic range with the use of specific illumination conditions. Methods that provide the two-dimensional distribution of the external magnetic field vectors are disclosed together with the methods of extraction of said information. The visualizing systems offer high spatial resolution and/or high magnetic field resolution combined with fast sampling rates and the capability of performing large-area imaging. The applications of such systems include nondestructive testing and damage assessment in metal structures via magnetic materials or induced currents, integrated circuit testing and quality control, general magnetic material and thin film research, permanent magnet quality control, superconductor research and many others.

110 Claims, 12 Drawing Sheets

OTHER PUBLICATIONS

Nikitenko V.I. et al, "Magneto-optical indicator film study of the magnetization of a symmetric spin valve," IEEE Transactions of Magnetics, vol. 32, (No. 5) Sep. 1996, p. 4639–4651.

Valeiko M.V. et al, "Magneto-Optical Visualizer-Magnetometer of High Magnetic Fields," IEEE Transactions of Magnetics, vol. 31, (No. 6, pt. 3) Nov. 1995, p. 4293–4296.

Vetoshko, P.M. et al., "Measuring low alternating magnetic fields by means of Bi-Containing rare-earth ferrite-garnet films with planar anisotropy," J. of Appl. Phys., 70: (10), pp. 6298–6300, Part 2 Nov. 1991.

Nikitenko V.I. et al, "Magneto-optical indicator film (MOIF) microscopy of granular and layer structures (abstract)," Journal of Applied Physics, vol. 79, (No. 8, pt. 2B), Apr. 1996 p. 6073.

Klank, M. et al., "Sensitive magneto-optical sensors for visualization of magnetic fields using garnet films of specific orientations," J. of Appl. Phys., 92 (11), pp. 6484–6488, Dec. 2002.

MAGNETIC FIELD AND ELECTRICAL CURRENT VISUALIZATION SYSTEM

CROSS-REFERENCES TO RELATED APPLICATIONS

This application claims priority from provisional application Ser. No. 60/445,832 filed Feb. 10, 2003 entitled "Magnetic Field and Electrical Current Visualization System".

This application is related to U.S. patent application Ser. No. 10/764,496 filed Jan. 27, 2004 which claims priority from provisional application Ser. No. 60/442,539 filed Jan. 27, 2003 entitled "SURFACE CORRUGATION ENHANCED MAGNETO-OPTICAL INDICATOR FILM".

Each of the above-referenced patent specifications is incorporated herein by reference.

FIELD

The technology herein relates to magnetic field and/or electrical current imaging systems using magneto-optical indicator films (MOIF) based on magneto-optical material with the in-plane, single easy axis type of magnetic anisotropy. The technology herein also relates to the method of extraction of the distribution of three-dimensional magnetic field vectors in the said MOIF. The exemplary non-limiting visualizing system disclosed herein provides exceptional advantages in converting magnetic field strength to visual images. Great enhancement in the dynamic range and resolution of the measurement of magnetic field strength and spatial distribution is gained. The visualizing system will measure magnetic field distributions resulting from permanent magnetic sources, electrical currents, electrically induced magnetic fields and the resultants of interacting magnetic fields and magnetic bodies. In addition, we disclose methods of using the same for applications in nondestructive testing and damage assessment in metal structures via magnetic materials or induced currents, integrated circuit testing and quality control, general magnetic material and thin film research, permanent magnet quality control, superconductor research and many others.

STATEMENT REGARDING FEDERALLY SPONSORED RESEARCH OR DEVELOPMENT

Not applicable.

BACKGROUND AND SUMMARY

Magnetic field imaging is an important technique used in converting magnetic field information to quantitative and visual information. It has wide range of established applications, including nondestructive testing and evaluation (NDE). NDE encompasses damage assessment in metal structures via magnetic materials or induced currents, integrated circuit testing and quality control, general magnetic material and thin film research, permanent magnet quality control, superconductor research and many others. There are several known techniques for visualizing the spatial distribution of magnetic fields or magnetic fields generated by electrical currents. These include for example:

SQUID (superconducting quantum interference device) microscopes,
Magnetic Force Microscopes ("MFMs"),
Magneto-Resistive (MR) scanning sensors and arrays, and
Magneto-optical imagers.

Of these different techniques, SQUID microscopes probably currently achieve the best magnetic field (or electrical current) resolution and sensitivity. See for example U.S. Pat. No. 5,894,220 to Wellstood et al (April 1999). However, known SQUID microscopes are generally expensive, slow and relatively limited in spatial resolution (e.g., currently limited to about 20–50 $\mu$m when imaging objects at room temperature).

MR sensor-based instruments are often cheaper, while offering good magnetic field or current resolution. However, MR sensor-based instruments don't always provide the requisite spatial resolution and speed. MFM offers superior spatial resolution but can be extremely slow, especially when visualizing large areas. In addition, the dynamic range and magnetic field and/or electrical current resolution of magnetic force microscopes are often limited.

Magneto-optical visualizer arrangements are well known. See for example Andrae U.S. Pat. No. 5,583,690; B. Ludescher, et al., "Faraday Low-temperature Microscope for observing Dynamic Magnetization processes in Superconductors ("Faraday-Tieftemperatur-Mikroskop zur Beobachtung dynamischer Magnetisierungsvorgange in Supraeitern", Laser und Optoelektronik 23 (1991), pages 54–58; L. A. Dorosinskii, et al., Physica C 203 (1992), page 149; and M. V. Indenbohm, et al., Physica C 209 (1993), page 295. Current magneto-optical based visualizers known to those skilled in the art offer high image acquisition speed and good spatial resolution (less than MFM but better than many other techniques). However, in general, such instruments currently have relatively limited magnetic field dynamic range and low-field visualization. They also require magneto-optical films with very specific properties. Such specific properties can be difficult to satisfy at a single temperature and virtually impossible to satisfy over a wide temperature range.

The Kerr microscope for revealing electrical currents using the polar Kerr effect, a reflective technique, is also known. See for example DE 4027049. However, limited polarization rotation can limit magnetic field resolution and dynamic range of the Kerr microscope instrument.

Magneto-optical visualizers that use variations of iron garnet as the magneto-optical material have many advantages. Such a material offers both high polarization rotation, which can translate into high magnetic field or electrical current dynamic range, and a wide range of magnetic properties. Furthermore, the magnetic properties can generally be tuned by adjusting the composition or other parameters. Several iron garnet-based visualizers are known to those skilled in the art.

Michael Faraday discovered magneto-optical ("MO") effects in 1845. Faraday noticed that magnetic lines of force from a magnet would affect polarized light rays passing through a glass rod. A Scottish scientist named John Kerr later published what came to be known as the Kerr electro-optic effect in 1875. This effect, for which Faraday had searched in vain some 40 years before, is the rotation of the plane of polarization of light in passing through an optical medium across which an electric potential is applied. Kerr's first results were for solid glass, which were followed by results using liquids in transparent cells. In the following year, he published details of another effect, the magneto-optic effect using an electromagnet. The magnetic effect showed that a rotation of the plane of polarization of light occurred on reflection from the polished pole of a magnet.

While the magneto-optical effects observed by Faraday and Kerr in media such as glass were relatively small, these effects are much larger in magnetic media. More recently, MO effects have been used for a variety of applications including magneto-optical recording (e.g., for high density data storage devices), optical communications, magnetic domain imaging, hysteresis loop plotting, Faraday microscopes, and other applications. For example, with the aid of the MO effects dynamic processes in superconductors and magnetic structures in magnetic storage media can be examined. Other applications include, but are not limited to, imaging of electrical current values and distributions on integrated circuits, visualization of magnetization dynamics of spin valves, viewing magnetic inks in currency, non-destructive testing of structural metals and imaging of permanent magnets.

Some magneto-optical visualizers use iron garnet films having perpendicular magnetic anisotropies, i.e., the magnetization vector (M) of the film is directed perpendicular to the film plane in the absence of an applied external field. Such films can be called "perpendicular films". This type of instrument is disclosed in, for example, U.S. Pat. No. 4,625,167 to G. L. Fitzpatrick (1986), U.S. Pat. No. 5,053,704 to G. L. Fitzpatrick (1991) and U.S. Pat. No. 5,446,378 to S. M. Reich et al. (1995). The general configuration for a magneto-optical imaging film used in such instruments is shown in FIG. 1a.

As shown in FIG. 1a, a flat wafer, composed of a substrate 2 having an active magneto-optical imaging layer 1 such as a film (MOIF), and a non-magnetic mirror or other high reflectivity layer 3 is placed on or very near the device under test (DUT) 4. The substrates may comprise a material such as Gadolinium/Gallium/Garnet (GGG), or an expanded lattice variant (large lattice constant, LLC GGG), with an applied thin film 1 of a Faraday rotation material, usually with bismuth substituted for yttrium, or Bi:YIG. The active magneto-optical imaging film 1 (MOIF) can be grown on the substrate 2 by, for a nonlimiting example, liquid phase epitaxy (LPE). An incident light 5 from a magneto-optical imaging system is directed to the MOIF structure 1. The reflected light 6 has a polarization state 7. The film 1 renders the magnetic fields visible because the rotation of the polarization of the incident light is magnetic field-dependent (through the magnetic-field dependence of the YIG film's magnetization state), providing intensity contrast when viewed between crossed polarizers.

In perpendicular films, the magnetization in domains is directed either up or down through the film thickness (i.e., always perpendicular to film's surface), thus providing maximum polarization rotation when illuminated in a direction normal to the film direction (see FIG. 1b). However, the perpendicular films can be limited in both spatial and magnetic field resolutions (see FIG. 1c). The spatial resolution is generally limited to the domain size (usually 5 to 50 μm cross-section) and the field resolution is generally limited to 2 bits of information (i.e., there is or is not a field magnitude comparable to or exceeding the coercivity of such a film).

For many applications, MOIF structures based on in-plane iron garnet films (FIG. 2a) are advantageous in terms of both the spatial and magnetic field resolutions. The "in-plane film" is defined as a film that has a magnetization oriented in the plane of the film if no external magnetic filed is applied. Depending on the composition and other parameters of the YIG film, two distinctive cases can be considered (as will be discussed in more detail below): one corresponds to the case of a single easy axis of the film which lies in the plane of the film (it will be denoted as "single-easy axis in-plane" arrangement), while a second corresponds to the case when film has three easy axes in the plane of the film. The latter will be denoted as a cubic-anisotropy, in-plane film, since it is the domination of the cubic crystalline anisotropy that causes this magnetic state of the film). FIG. 2a shows a magneto-optically in-plane active layer 1 disposed on a substrate 2, a high reflectivity layer 3, a device under test (DUT) 4, incident light 5; reflected light 6 and polarization state 7 of the reflected light. When illuminated at normal incidence, such films generally do not exhibit any polarization rotation in the absence of the applied external field. Magnetic fields generated by the DUT (Device Under Test) 4 are generally non-uniform due to domain structure, current flows, magnetic flux patterns, geometry or other reasons. Such non-uniform fields cause local rotation of magnetization vector M from the plane of the film, leading to appearance of the to out-of-plane components of M. Polarization rotation in such a visualizer arrangement will be proportional to the out-of-plane component of M and, thus to the applied perpendicular external field. In such a visualizer, spatial resolution will be greater than that using the perpendicular films because gray-scale information will be obtained from the partial rotation of local vector magnitudes. This increase of spatial resolution will be limited to either the limit of the optical system or to the iron garnet film thickness, which must be large enough to provide enough rotation of the light to obtain a resolvable signal. Such an approach can be used to provide quantitative information on local field strength. See, for example, Nikitenko V. I. et al, *IEEE Transactions of Magnetics*, Vol. 32, (no. 5) September 1996, p.4639; Valeiko M. V. et al, *IEEE Transactions of Magnetics*, Vol. 31, (no. 6, pt. 3) November 1995, p.4293; and Nikitenko V. I. et al, *Journal of Applied Physics*, Vol. 79, (no. 8, pt. 2B), April 1996 p.6073.

Magnetic field and/or electrical current visualizers based on in-plane iron garnet films are seen in, for example, U.S. Pat. No. 5,969,517 to V. R. M. Rao; U.S. Pat. No. 6,084,396 to V. R. M. Rao; U.S. Pat. No. 5,663,652 to M. R. Freeman; and U.S. Pat. No. 6,141,093 to Argyle, et al. However, while much work has been done in the past in this area, further development is possible and desirable.

A simplified schematic view of an exemplary illustrative prior art visualizer for detection of the perpendicular magnetic fields and/or electrical currents is shown in FIG. 2b. In this particular illustrative example, an illumination source P1 provides a light beam that passes through a polarizer P2 to strike a beam splitter P3. The beam splitter P3 directs part of the beam through optics P4 to the MOIF film P5 placed in proximity with a device under test P6. Magnetic fields from the device under test P6 influence the magnet-optical properties of the MOIF film P5—causing localized polarization rotation as is well known. The resulting light with spatially altered polarization distribution passes through optics P4 and is directed via beam splitter P3 through an additional polarizer P7 to a detector P8. In this particular example, the MOIF film P5 comprises an in-plane YIG configuration.

FIG. 2c shows an exemplary image of magnetic fields generated by the surface of a permanent magnet obtained with in-plane YIG and associated visualizer of the type shown in FIG. 2b. By comparing FIGS. 2b and 1c, it is apparent that the information about the magnetic field's value and spatial distribution using an exemplary in-plane YIG is generally much more detailed as compared to the information obtained from an exemplary perpendicular YIG. However, there have been certain disadvantages in using in-plane films in the prior art, although it should be noted that disadvantages are different for different disclosed arrangements.

For example, with regard to the visualizers disclosed by Nikitenko V. I. et al, *IEEE Transactions of Magnetics*, Vol. 32, (no. 5) September 1996, p.4639, Valeiko M. V. et al, *IEEE Transactions of Magnetics*, Vol. 31, (no. 6, pt. 3) November 1995, p.4293, Nikitenko V. I. et al, *Journal of Applied Physics*, Vol. 79, (no. 8, pt. 2B), April 1996 p.6073] and in U.S. Pat. No. 6,141,093 to Argyle, et al., one problem is the difficulty of achieving good enough collimation of polychromatic light from the visualizer's illuminator P1 to provide enough extinction between crossed polarizers. This often results in background noise and a low dynamic range of the visualizer. Narrow band-pass filters can be used to suppress such a problem and to increase the dynamic range by several times. However, due to the low spectral density of commonly available microscope illuminators, CCD camera dark noise becomes an issue if the narrow band-pass filter transmission band is narrow enough (i.e., there is a trade-off between extinction and overall intensity of light reaching the detection unit P8). In addition, variations in microscope illumination intensity and spectral distribution of the emitted light (e.g., due to heating or other effects) may cause a stability problem in this type of visualizer, possibly requiring frequent recalibration and decreasing long-term accuracy.

Use of laser sources for visualizer illumination is known from, for example, U.S. Pat. No. 5,969,517 to V. R. M. Rao, U.S. Pat. No. 6,084,396 to V. R. M. Rao, U.S. Pat. No. 5,663,652 to M. R. Freeman, and U.S. Pat. No. 6,141,09. Laser illumination provides certain advantages but can cause parasitic interference and speckle patterns due to the long coherence length of laser source. These effects may under some circumstances add considerable noise, thus limiting dynamic range and spatial and magnetic field resolution The visualizers disclosed in U.S. Pat. Nos. 5,969,517 and 6,084, 396 both issued to V. R. M. Rao appear to avoid this problem by measuring the magnetic field at a single point at a time. However, these arrangements require relatively complicated and expensive mechanics to perform scans over a whole wafer. For example, in such a visualizing instrument, the optics and MOIF film are generally fixed while the wafer is moved on precise mechanical stage. In addition, even though the dynamic range and magnetic field resolution achievable with such visualizers may exceed that of the other prior art visualizer designs, the dynamic range and magnetic field resolution may be limited at low magnetic fields. This is due to the properties of in-plane YIGs, which often have high levels of perpendicular saturation field.

The main driving force in YIG material research and development has been magnetic bubble technology. With the collapse of the magnetic bubble industry, much of the accumulated YIG-growing skills and expertise are beginning to be lost. In the past, thin in-plane YIG films with anisotropy fields (saturation in the perpendicular direction) as small as 3 Oe were not uncommon. See, for example, Vetoshko, P. M. et al., *J. of Appl. Phys.*, 70: (10), pp. 6298–6300, Part 2 November 1991—which along with U.S. Pat. Nos. 5,969,517 and 6,084,396, also discloses single point (i.e., measurement at normal incidence) sensing using such films with balanced detection. Such designs provided the opportunity for visualizing sub-mOe fields. However, the best reported YIGs grown recently appear to have anisotropy fields of at least 40 Oe. See e.g., Klank, M. et al., *J. of Appl. Phys.*, 92 (11), pp. 6484–6488, December 2002. With available films, the magnetic field resolution of the prior art visualizers utilizing in-plane YIGs may be limited to ~10–100 mOe. Unfortunately, this limits the penetration of such a technique into many high-volume markets, such as IC (integrated circuit) current visualization. Current art MOIF visualizer methods due to the better sensitivity of competitive techniques such as the SQUID microscopy. Therefore, a solution to current art problems is desirable.

Exemplary non-limiting illustrative implementations of the technology herein provides practical magnetic field and/or electrical current visualizing techniques and arrangements offering wide dynamic range, superior spatial and magnetic field (equivalently, electrical current resolutions) and fast image acquisition. A MOIF film with improved imaging properties, and new visualizers that utilize said improved MOIF film are also disclosed.

The designs of exemplary non-limiting visualizers described herein are based on the peculiar magnetic properties of YIG films. For example, even YIG films that are the magnetically hardest in the perpendicular direction (i.e., with high perpendicular saturation fields) often exhibit low in-plane saturation fields (as will be shown below). The in-plane saturation field is often below 10 Oe and sometimes is below 2 Oe. Hence, the visualization of the projection of the external field on the in-plane hard axis of the YIG film can provide sub-mOe magnetic field resolution.

In-plane components of the magnetization vector generally cannot be detected when MOIF is illuminated at a direction that is normal to the YIG film (as for example in prior art visualizers of FIGS. 1*a*, 2*a* and 2*b*) since the polarization rotation occurs only when the magnetization has a component collinear to the light propagation direction. However, detection of the in-plane component is possible when a MOIF film is illuminated at an oblique angle, i.e. the incident beam is tilted by a predetermined angle with respect to the perpendicular direction as schematically shown in FIG. 3*a*. In FIG. 3*a*, the "plane of incidence" is the plane containing both the incident and reflected light beams. In one example, in order to achieve linear dependence of the polarization rotation on the value of the projection of in-plane magnetization components on the plane of incidence, the in-plane hard axis of the YIG should lie substantially or entirely in the plane of incidence, while the easy axis may be directed substantially or exactly perpendicular to the plane of incidence. This way, no polarization rotation occurs when no external magnetic field having a non-zero projection on the hard axis direction is present. It should be noted that a YIG film suitable for such a MOIF visualizer might, in one example, have uniaxial energy exceeding by at least an order of magnitude the cubic anisotropy energy. Otherwise, instead of a single easy axis direction in the plane of the YIG film, there may be three easy axis directions.

It should be noted that since the detected magnetization projection should be collinear with the direction of light traveling through the YIG, in the example tilted YIG film visualizer cited, the detected projection of the magnetic field is now also tilted with respect to the light propagation direction. This effect is quite strong since YIGs typically have quite high refractive indices (about 2.3 at a 633 nm wavelength). Thus, in the case of a 45° incidence angle of the beam onto the top surface of the YIG film, the angle of incidence in the YIG will be only ~17°, providing only ~33% of the possible signal. Higher tilts can be utilized, but spatial resolution may be sacrificed under certain circumstances. The solution of this problem can be found, for example, by using a prism in contact with the GGG substrate side of a YIG wafer utilizing an index matching liquid between the prism and the GGG. In the case of a right-angle prism, the signal will be 50% of the full signal and for a 60° prism it will be 60%.

Exemplary illustrative non-limiting implementations of the technology herein also provides a practical method of extracting vector information on the spatial distribution of the magnetization in the YIG layer by imaging independently the magneto-optical response in the direction perpendicular to the film and in the direction of tilt. In this case, the in-plane hard axis of the YIG film must be in the plane of incidence of said tilted beam. This can be accomplished by introducing two at least partially separate optical paths. In such an arrangement, the in-plane hard axis and perpendicular magnetization components can be extracted simultaneously. An exemplary method of separation is fairly straightforward. The signal from the first optical path (tilted beam) will take the form $\Phi_1 = K_{11} \cdot \theta \cdot M_z + K_{12} \cdot \theta M_x$, and the signal from the second optical path (perpendicular beam) will take the form $\Phi_2 = K_2 \cdot \theta M_z$. In these expressions, $\theta$ is the Faraday rotation per unit length of the YIG film; and $K_{11}$ and $K_{12}$ are the coefficients describing the sensitivity of the first path to the perpendicular and in-plane magnetization projections. These sensitivity coefficients depend on the particular visualizer implementation. $K_2$ is a similar sensitivity coefficient characterizing the second optical path. A coordinate system is introduced such that the Z-axis is normal to the YIG film and the Y-axis is normal to the plane of incidence. Since the coefficients $K_{11}$, $K_{12}$ and $K_2$ are constants during the measurements and can be determined prior to said measurements, the values of the magnetization projections can be obtained according to the simple formulas: $M_z = \Phi_2/(K_2 \cdot \theta)$ and $M_x = \Phi_1/(K_{12} \cdot \theta) - \Phi_2 \cdot K_{11}/(K_2 \cdot K_{12} \cdot \theta)$. In such a method, a DC bias magnetic field slightly exceeding the coercivity of the YIG film (typically in the range of 0.05–1 Oe) is applied along the Y-axis (i.e. in the direction of the in-plane easy axis). Thus, the YIG crystal will be always be magnetized to saturation, so the magnitude of the magnetization vector can be preliminarily measured. Hence, the third component of the magnetization vector can be also identified according to the formula $M_y = = (M_x^2 - M_x^2 - M_z^2)^{1/2} = \{M_s^2 - [\Phi_2/(K_2 \cdot \theta)]^2 - [\Phi_1/(K_{12} \cdot \theta) - _2 \cdot K_{11}/(K_2 \cdot K_{12} \cdot \theta)]^2\}^{1/2}$. This allows full vector information on the YIG magnetization and through it applied magnetic field vector to be determined.

Exemplary illustrative non-limiting implementations also provides a practical method of extracting vector information on the spatial distribution of magnetization in the YIG layer through utilization of a surface plasmon (SP) enhanced MOIF film such as was disclosed in patent application Ser. No. 60/442,539 filed Jan. 27, 2003 entitled "SURFACE CORRUGATION ENHANCED MAGNETO-OPTICAL INDICATOR FILM", incorporated herein by reference. It is based on the fact that for SP-enhanced MOIF, the MO polarization rotation is maximum around the TM polarization state of the incident light and close to zero around the TE polarization state of incident light. This property allows the use of the TE polarization of incident light for detecting perpendicular external magnetic fields and the TM polarization to detect low-to-very low in-plane fields. In order to do this, the magnetic anisotropy of the YIG should preferably be of the in-plane, single easy axis type and the grating grooves should be collinear to the easy axis direction. In this case, if the polarizer is oriented such that the incident beam has the TM polarization, the reflected beam will have its polarization altered according to both in-plane grooves perpendicular to the grating and perpendicular projections of the YIG film magnetization. If the polarizer is oriented such that the incident beam has a TE polarization, the reflected beam will have its polarization altered according to the perpendicular projection of the YIG film magnetization. The signal processing and control can be similar to that disclosed above (in relation to the non SP-enhanced MOIF films), except that instead of using two separate optical paths, two images corresponding to two states of the polarizer are acquired through a single optical path.

BRIEF DESCRIPTION OF THE DRAWINGS

These and other features and advantages provided in accordance with illustrative exemplary non-limiting embodiments will be better and more completely understood by referring to the following detailed description in connection with drawings, of which:

FIG. 5b is an exemplary beam diagram of the visualizer of FIG. 5a;

in FIG. 10a, the easy axes are tilted with respect to the plane of the film, and the hard axes are slightly tilted from (100), (010) and (001) directions. In FIG. 10b, a single easy axis lies in the plane of the film;

DETAILED DESCRIPTION OF PRESENTLY PREFERRED EXAMPLE EMBODIMENTS

Exemplary Non-Limiting Tilted Angle Visualizer

Figure 3A:
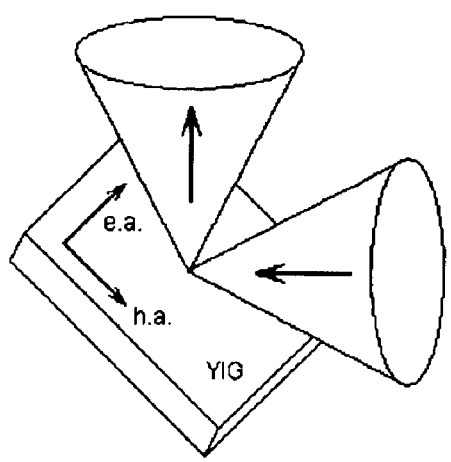
FIG. 3a shows an exemplary drawing of the orientation of the incident light and magnetic axes of the iron garnet film in an exemplary tilted-angle visualizer.
Figure 3B:
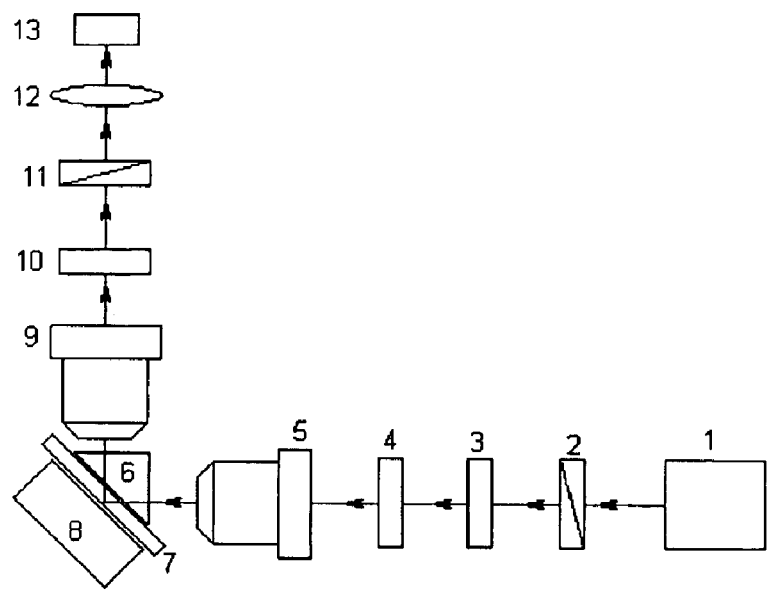
FIG. 3b is a schematic view of an exemplary non-limiting illustrative magnetic field visualizer for the visualization of low in-plane magnetic fields.

According to one exemplary illustrative non-limiting implementation, the advantageous magnetic field and/or electrical current visualization features are available when utilizing an in-plane, single easy axis MOIF film and a visualizing system employing tilted-angle illumination. An illustrative schematic view of a non-limiting magnetic field and/or electrical current visualizer is shown in FIG. 3b. The light from a light source 1 is collimated by a collimator (not shown in the FIG. 3b) and passes through the polarizer 2. Light source 1 can be a broadband light source such as, for example, halogen or any other lamp known to those skilled in the art, or a relatively narrowband source such as light emitted diode (LED), superluminescent diode, or truly narrowband source such as laser or laser diode. Polarizer 2 transmits the first polarization component of the incident light and rejects the orthogonal polarization component. Polarizer 2 can for example be a Glan-Thompson polarizing cube, a sheet polarizer or any other polarizer known to those skilled in the art. From polarizer 2, the beam passes through a wave plate 3. Wave plate 3 can be, for example, a half-wave plate that is used to adjust the polarization of the beam thus improving the extinction (and, through that, the resolution and dynamic range) of the visualizer. Use of the wave plate 3 is optional and it can be avoided if higher resolution and/or dynamic range are not necessary.

The polarized beam passes through a narrowband pass filter 4, which transmits only a narrow wavelength band and rejects the rest of the light. Filter 4 is also optional and not necessary for narrow band light sources. The light is then directed through the microscope objective (or lens) 5 to the MOIF film 7, which is in close contact with the device under test ("DUT") 8.

A prism 6, in immersion contact with the MOIF film 7, can be used to provide a larger signal, as discussed previously. The beam can be focused on the YIG/mirror interface of the MOIF film 7 for high spatial resolution measurements, or alternatively, can be expanded and can be directed as a plane parallel beam (not shown) to the MOIF film for wide area, but low- to-moderate, spatial resolution, visualization. If a relatively high coherence length source is used as a light source (for example, a laser diode or laser), a spatial filter (e.g., a homogenizer not shown in the drawing) can be placed anywhere between the light source and lens system 5 to improve the spatial uniformity of the beam.

The beam reflected from the MOIF film has its polarization altered within the beam cross-section according to the magnetization distribution in the YIG layer. The reflected beam is collimated by the lens system 9 (which can be microscope objective, lens or system of lenses), and directed toward the optional wave plate 10. Wave plate 10 can be, for example, a half-wave plate used to adjust the polarization of the beam, thus improving the extinction (and, through that, the resolution and dynamic range) of the visualizer. A quarter-wave plate can be used instead of the half wave-plate to compensate the ellipticity of the beam caused by the reflection at oblique angle.

The beam then passes through the polarizer 11. Polarizer 11 is oriented to pass the polarization orthogonal to the original polarization of the beam (i.e. only the component of polarization that was introduced due to the polarization rotation in the YIG) and to reject all other polarization components. The beam is directed by a lens 12 (optional) to the detection unit 13. Detection unit 13 can be, for example, a CCD camera, a CMOS camera, an ocular for observation by eye, or any other imaging device known to those skilled in the art.

Figure 1A:
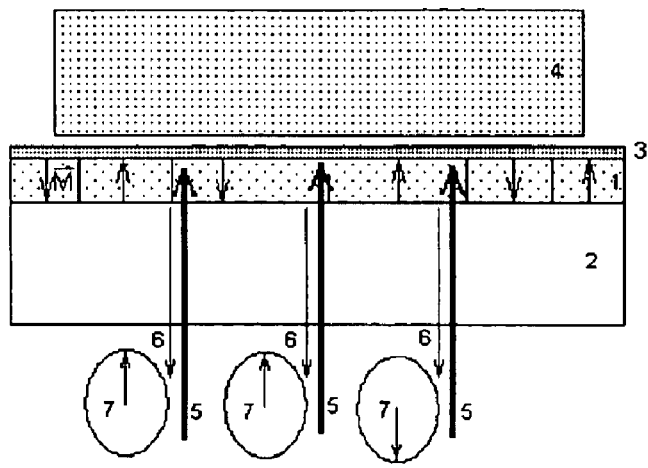
FIG. 1a is a schematic view of an exemplary prior art MOIF structure with MO-active layer having perpendicular magnetic anisotropy.
Figure 1B:
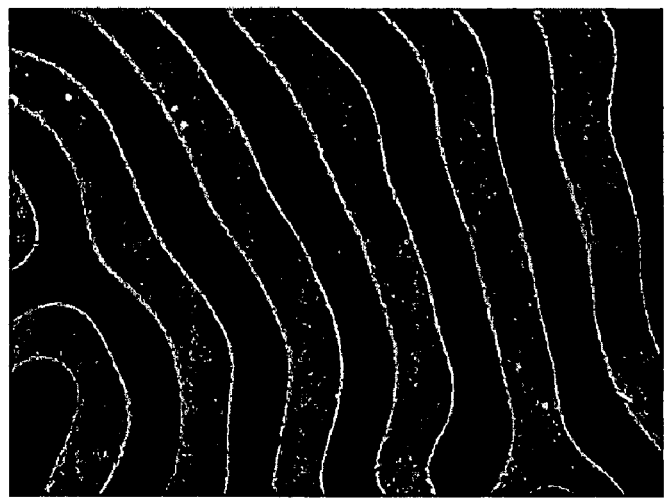
FIG. 1b is an exemplary microscope image of the magnetic domains in an iron garnet film having perpendicular magnetic anisotropy.
Figure 1C:
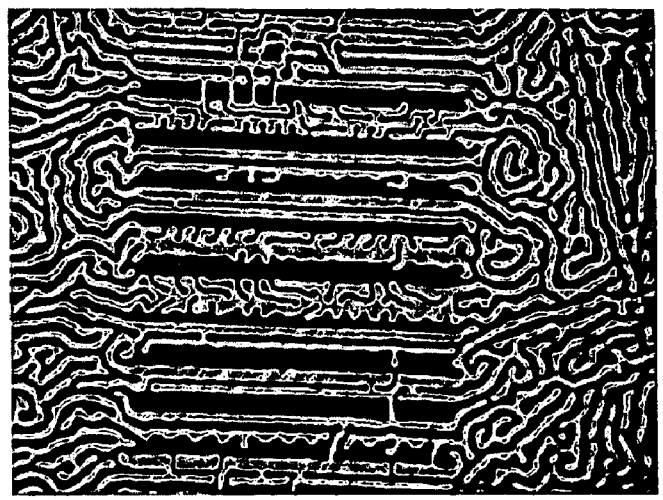
FIG. 1c is an exemplary microscope image of audio tape magnetic bits obtained with an exemplary prior art iron garnet film having perpendicular magnetic anisotropy.
Figure 2A:
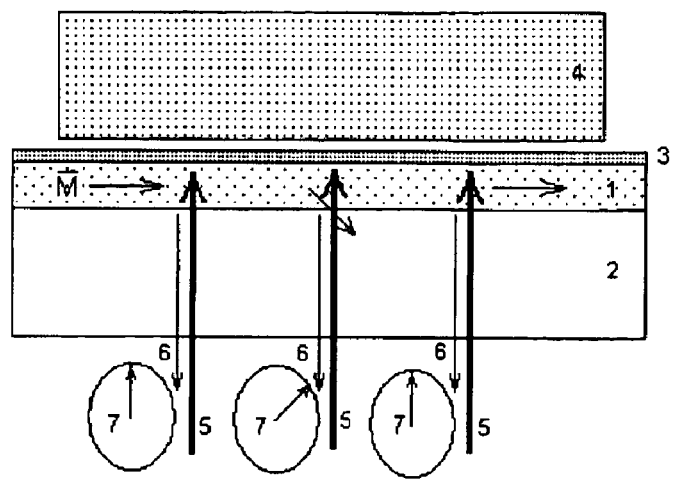
FIG. 2a is a schematic view of an exemplary prior art MOIF structure with MO-active layer having in-plane magnetic anisotropy.

Instead of single-wavelength (or single narrow wavelength band) illumination, the visualizer of FIG. 3b can be equipped with a dual wavelength (or relatively wide wavelength band) illumination system for obtaining a magnetic field and/or electrical current distribution image at one wavelength and obtaining an optical image of the DUT surface at another wavelength. In this case, the mirror 3 (see FIG. 2a) on the YIG surface can be an interference-based, highly reflecting mirror (also known as a dielectric multilayer reflector) with a reflection band coinciding with only one of the multiple wavelength bands of the illumination system. The visualizer of FIG. 3b can use long-working distance microscope objectives if intended for high-spatial resolution imaging (smaller than lam).

Figure 3C:
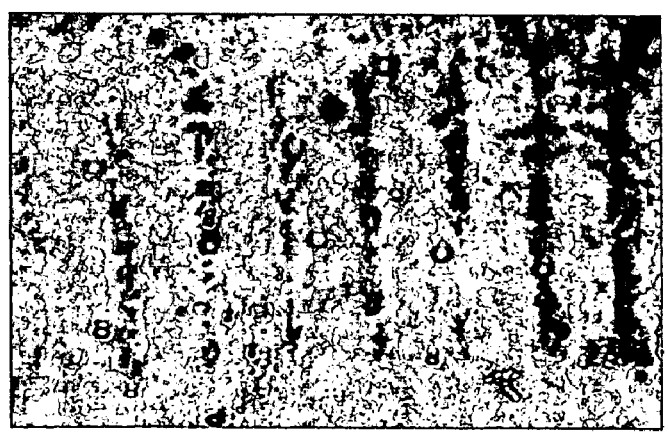
FIG. 3c shows an exemplary microscope image of the in-plane magnetic fields generated by the magnetic bits from a damaged audio tape obtained using magnetic field visualizer of FIG. 3b.
Figure 3D:
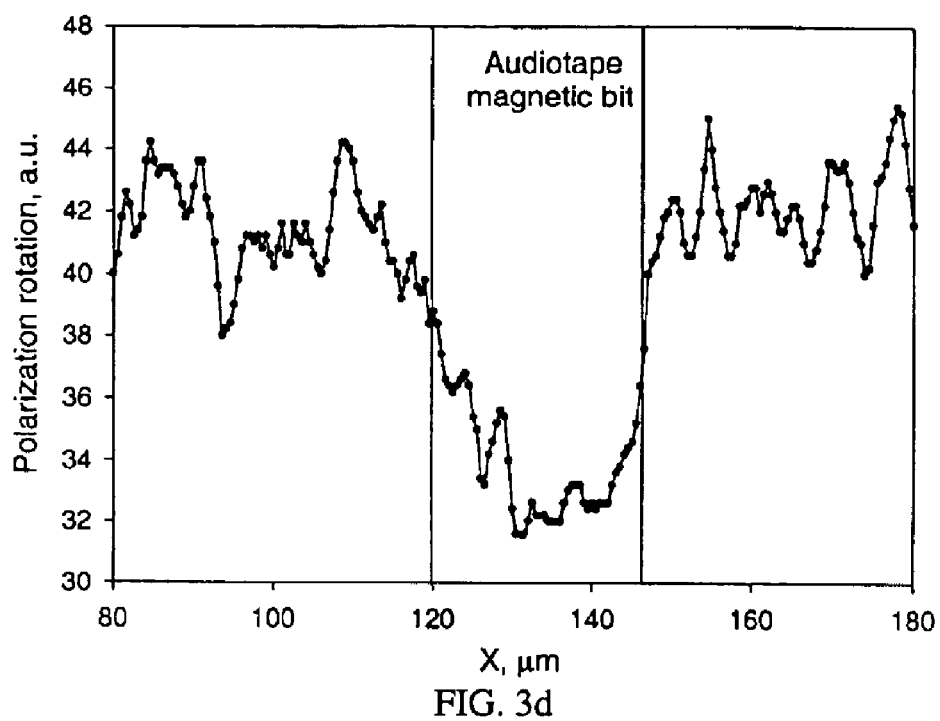
FIG. 3d shows a magnified image cross-section of a single audio tape bit of FIG. 3c.

One exemplary, specific, non-limiting implementation of the MOIF visualizer shown in FIG. 3b includes a YIG film 7; e.g., sample LLC 178-2 with a thickness of 2.2 $\mu$m, made by Northrop-Grumman. Such a YIG film 7 exhibits a perpendicular saturation field of approximately 300 Oe. This film, when used in the tilted-angle visualizer, produces easily detectable images, as shown in FIGS. 3c and 3d. For testing purposes, DUT 8 may comprise a magnetic audio tape that has been partially erased to provide a small signal. FIG. 3c shows an exemplary MOIF image of the in-plane field generated by the magnetic tape. FIG. 3d shows an example magnified MOIF image cross-section of a single audio tape bit. These figures show that utilization of low in-plane saturation of the YIG material provides an ability to visualize fields that were generally inaccessible using prior art, normal incidence visualizer designs with the magnetically hard in the perpendicular direction YIG films. However, in some applications, some additional problems may also arise in the form of poor extinction/low power trade-off for wide band illuminators, and speckle patterns and parasitic interference problems for laser-based illuminators.

Exemplary Non-Limiting Scanning Visualizer Implementation

Figure 4A:
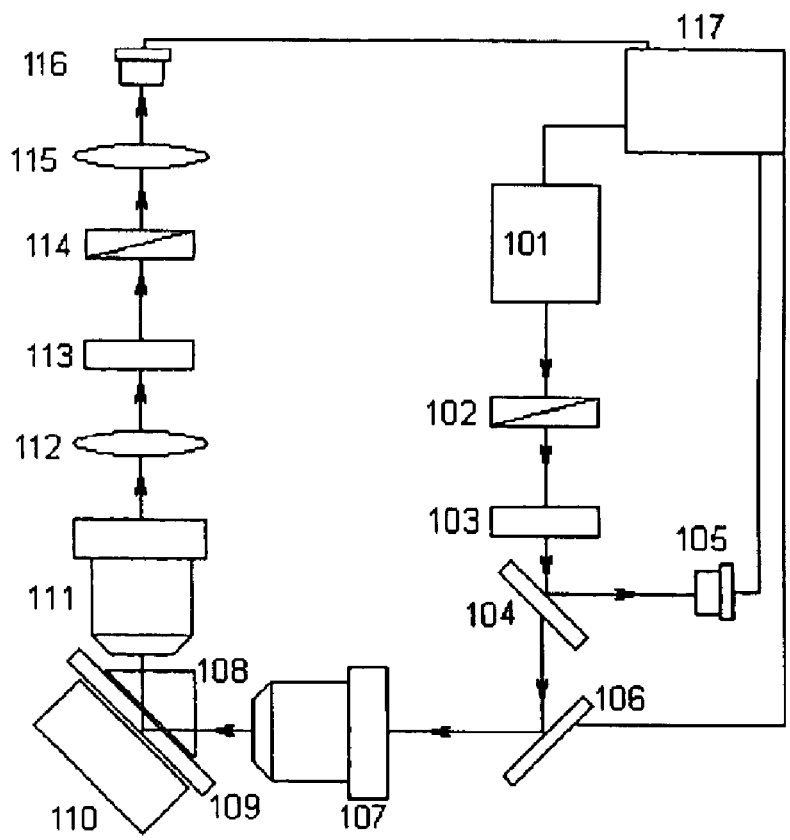
FIG. 4a is a schematic view of an exemplary high-spatial resolution scanning laser magnetic field visualizer for visualization of low in-plane magnetic fields based on Malus' polarization detection arrangement.

The resolution and dynamic range of the tilted angle visualizer can be further enhanced through the suppression of speckle pattern/parasitic interference by utilizing a scanning laser visualizer design shown schematically in FIG. 4a. Laser scanning techniques have been applied in the past to normal incidence visualization (see e.g., Valeiko M. V., et al, *Colloid Journal*, 57: (6), pp. 860–862, November-December 1995), i.e., when no in-plane magnetization was detected. The embodiment taught in FIG. 4a offers several orders of magnitude better performance. See the single-point measurements (no visualization have been accomplished) disclosed in U.S. Pat. Nos. 5,969,517 and 6,084,396 both issued to V. R. M. Rao. Another benefit of the FIG. 4a embodiment is that at any point across the scanned area of the YIG wafer, the whole power of the laser source is utilized, thus eliminating photon-limiting and heating problems.

FIG. 4a is an illustrative schematic view of a non-limiting exemplary scanning laser magnetic field and/or electrical current visualizer. The collimated light beam from a laser 101 passes through the polarizer 102. Laser 101 can be a laser diode, solid state laser, gas laser or any other laser source known to those skilled in the art. Polarizer 102 transmits the first polarization component of the incident light and rejects the orthogonal polarization component. Polarizer 102 can be, for example, a Glan-Thompson polarizing cube, a sheet polarizer or any other polarizer known to those skilled in the art. In this aspect of the present embodiment, the polarized beam passes through a wave plate 103. Wave plate 103 can be, for example, a half-wave plate used to adjust the polarization of the beam, thus improving the extinction (and, through that, the resolution and dynamic range) of the visualizer. The wave plate 103 is optional, but may improve the signal-to-noise ratio. Next, the beam is directed to a semitransparent mirror 104, oriented at some angle with respect to the beam propagation direction. Mirror 104 reflects part of the incident beam to an intensity-monitoring detector 105 (connected to the processor 117), and transmits the rest of the light. The semitransparent mirror 104 can, for example, reflect 1% of the beam to photodetector 105 and transmit 99%, or any other ratio of the reflected and transmitted portions can be used that is suitable for the particular visualizer.

The transmitted beam is directed towards a two-dimensional angular-scanning system 106. Scanning system 106 can be a single two-dimensional scanning mirror such as a MEMS-scanning mirror model TM-8001 from MEMS Optical Corp. Alternatively, scanning system 106 can comprise an assembly of two single-axis mirrors with optical elements (such as lenses) between them, or any other non-limiting two-dimensional or other scanning optical assembly known to those skilled in the art.

The 2D angular scanning system 106 directs the beam through a microscope objective 107 or other lens to illuminate the MOIF film 109. MOIF film 109 is in close contact with the DUT 110. A prism 108 in immersion contact with the GGG substrate on which MOIF film 109 resides can be used to enhance the signal. The beam can be focused on the YIG/mirror interface of the MOIF film 109 for high spatial resolution measurements. Alternatively, the beam can be collimated and directed to the MOIF film 109 for wide area, low-to-moderate spatial resolution visualization.

The light beam reflected from the MOIF film 109 will have a polarization that is altered differently for different positions of the processor-controlled (117) scanning system 106 according to the magnetization distribution in the YIG layer. The reflected beam is, in this example, collimated by a lens system 111–112 (which can be microscope objective, lens or system of lenses). The lens system 111–112 directs the collimated beam toward an optional wave plate 113. Wave plate 113, if present, can be, for example, a half-wave plate used to adjust the polarization of the beam, thus improving the extinction of the visualizer (and, through that, the resolution and dynamic range). Alternatively, a quarter-wave plate can be used instead of the half wave-plate to compensate for the ellipticity of the beam caused by the reflection at oblique angle.

The beam then passes through a polarizer 114. Polarizer 114 is preferably oriented to pass the polarization orthogonal to the original polarization of the beam (i.e. only the polarization component introduced by the polarization rotation in the MOIF) and to reject all other polarizations. The polarized beam is directed by an optional lens 115 to the photodetector unit 116, which in turn provides a detected signal to the processor 117.

According to a further illustrative non-limiting exemplary implementation, instead of using single-wavelength illumination, the visualizer of FIG. 4a can be equipped with a dual wavelength (or wide wavelength band) illumination system for obtaining the magnetic field and/or electrical current distribution image at one wavelength(s) and obtaining the optical image of the DUT 110 surface at another wavelength(s). In such an implementation, it may be desirable to add a wavelength-selective mirror placed between the polarizer 114 and detector 116 at some angle with respect to the beam propagation direction. An additional detector can be placed to acquire the portion of the light beam reflected from the wavelength-selective mirror.

According to a still further aspect of the present embodiment, the visualizer of FIG. 4a can be equipped with long working distance microscope objectives if used for high-spatial resolution imaging (smaller than 1 $\mu$m). In such an exemplary visualizer implementation, the ratio of the signal from the photodetector 116 to the signal from the photodetector 105 gives information about the magnetization component parallel to the plane of incidence in the YIG film 109 at the location of the YIG film. This information is defined by the state of the 2D angular scanning mirror at any given time, so a complete and accurate image of the magnetic field and/or electrical current distribution across the scanned area of the DUT 110 can be created through the scanning cycle. The speed of image acquisition generally is defined by the speed of the 2D scanning system 106. Advances in MEMS scanning mirrors suggest that images as large as 10,000×10,000 points can be acquired as fast as in 1 to 10 seconds, for example. The scanning system 6 can be operated in step-by-step mode, in continuous scanning mode, or in another desired scanning mode.

In accordance with a further aspect of a non-limiting exemplary illustrative implementation, enhanced sensitivity, resolution, dynamic range and stability of the visualizer is possible if the detector unit utilizes a balanced photodetector arrangement with (optionally) modulated incident light and a lock-in detection method. Such an arrangement gives straightforward information about the sign (direction) of the magnetization at any point of the scanned area of the MOIF film. Such a visualizer also suppresses noise caused by the background light.

Figure 4B:
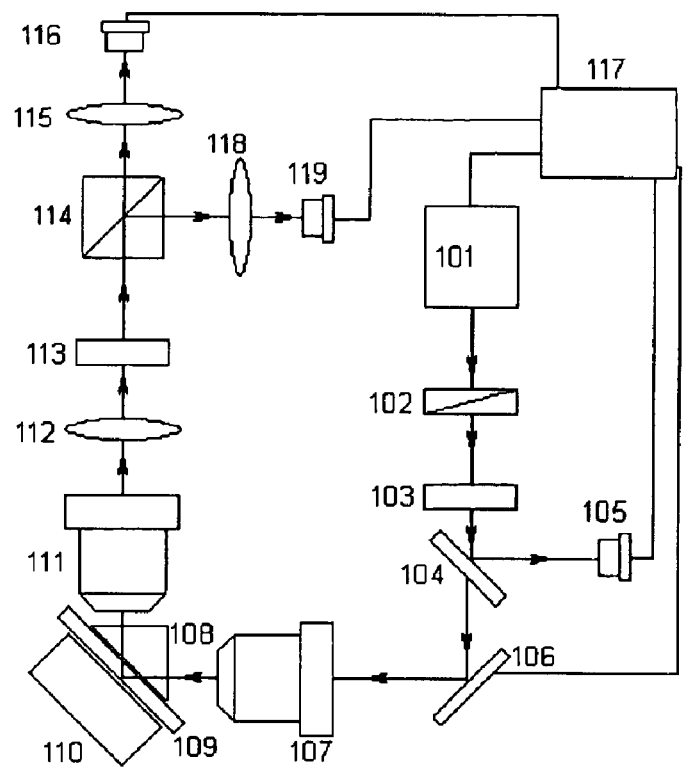
FIG. 4b is a schematic view of an exemplary high-spatial resolution scanning laser magnetic field visualizer for visualization of low in-plane magnetic fields based on a balanced detection arrangement.

Another illustrative schematic view of a magnetic field and/or electrical current visualizer is shown in FIG. 4b. The elements 101 to 113 are the same as in FIG. 4a (previous aspect of the first embodiment). After the wave plate 113, the beam is divided by the polarizing beamsplitter 114 into two beams with orthogonal polarizations. The beams are then directed to photodetectors 116 and 119 respectively with the assistance of optional lenses 115 and 118. Photodetector units 116 and 119 provide signals to the processor 117. The polarizing beamsplitter 114, wave plates 103 and 113 and polarizer 102 are oriented so the divided beams intensities are approximately equal when no external field is applied to the YIG film 109 (i.e., when the MOIF does not produce any polarization rotation). The signals from the detectors 116 and 119 are then subtracted by the processor 117 and the difference is normalized by the signal from the photodetector 105. This provides accurate, sign-sensitive magnetic field and/or electrical current detection. Alternatively, instead of using the photodetector 105, the signals from the photodetectors 116 and 119 can be subtracted and the difference can be normalized by the sum of the two signals in the processor 117 to compensate for drifts in laser power and/or polarization. Other arrangements are possible.

Figure 5A:
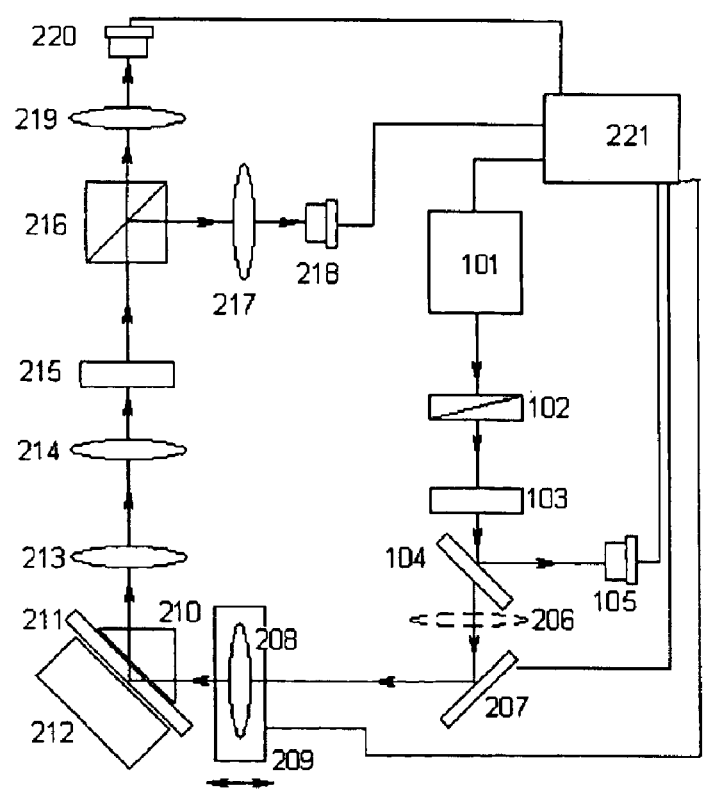
FIG. 5a is a schematic view of an exemplary wide field-of-view scanning laser magnetic field visualizer for visualizing low in-plane magnetic fields based on a balanced detection arrangement.
Figure 5B:
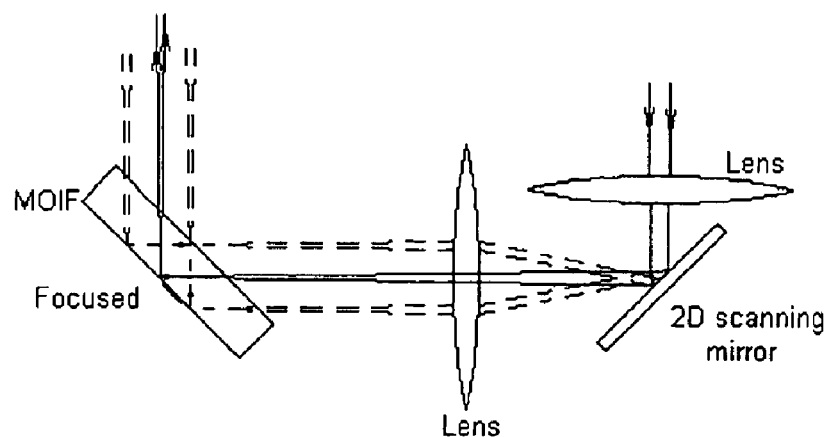

The visualizers of FIGS. 4a and 4b (previous aspects of exemplary illustrative non-limiting implementations) are designed for small-area, high-spatial resolution visualization or for moderate area, moderate spatial resolution visualization. For large area, moderate spatial resolution visualization, the DUT and/or the MOIF film should preferably be assembled on a translation stage, or the arrangement for the visualizer can be slightly modified. According to a further aspect of the first embodiment, large area visualization with the system of the first embodiment can be achieved by a modification of the imaging system. An exemplary, non-limiting, moderate-to-high spatial resolution visualizer providing superior magnetic field and/or electrical current resolution and dynamic range is schematically shown in FIG. 5a. The design of such a visualizer is similar to one shown in FIG. 4b (previous aspect of the first embodiment) up to the lens 206 in FIG. 5a (where the scanning system 106 in FIG. 4b is located) and after lens 214 in FIG. 5a (where the lens 112 in FIG. 4b is located). Exemplary polarization detection block elements 215–220 in FIG. 5a can be arranged in the so-called Malus form such as in FIG. 4a, or as balanced detectors as shown in FIG. 5a. The laser light can be also modulated and the detected signal can be filtered through a lock-in amplifier in order to suppress background noise.

As shown in exemplary FIG. 5a, lens 208 is placed onto a single axis processor-controlled translation stage 209. A large focal distance focusing lens 206 is provided to extend the capabilities. Alternatively, lens 206 can be substituted by a concave mirror can be substituted, which can be part of the scanning system 207 if desired). If the lens 208 is fixed relative to 211, the beam cross-section when it reaches the YIG film 211 will be different at different positions (i.e. the focal point will be at different depths at different locations across the YIG wafer). This is due to the limited depth of focus of lenses, and in some applications the limitation is the large scale of the wafer (for example, one can use such an arrangement for visualization of 1 to 30 cm$^2$ areas). This can cause non-uniform and generally non-optimized spatial resolution across the DUT. The spatial resolution can be approximately defined in this case as the diameter of the beam cross-section at the YIG-mirror interface. According to a further aspect of exemplary non-limiting illustrative implementations, this effect can be compensated by the active adjustment of the position of the lens 208 along the beam propagation direction according to the deflection angle of the 2D angular scanning system 207. A visualizer with such an active adjustment provides the potential for visualizing large areas with moderate or even high spatial resolution and superior magnetic field and/or electrical current resolution and dynamic range. This is important in various applications including, as a nonlimiting example, IC (Integrated Circuit) circuit testing.

Exemplary Non-Limiting Dual Optical Path Visualizer

The visualizers shown in FIGS. 4a, 4b and 5a provide a dynamic range of on the order of $10^4$ to $5 \times 10^5$ depending on the complexity of the system (i.e. with or without modulation, etc.). Such visualizers are generally suitable either for low in-plane field visualization (up to 2 Oe), or for moderate-to high perpendicular field visualization (e.g., when used in a perpendicular geometry). However, tilted-angle visualizer geometry provides the opportunity for detecting both in-plane projections of the applied field on the hard axis and perpendicular projections of the applied field at the same time. This, in turn, offers the opportunity to design magnetic field and/or electrical current visualizers with a large dynamic range using the same YIG material (or MOIF design).

Typical single in-plane easy axis-type anisotropy YIG films have a perpendicular saturation field on the order of several kOe and in-plane saturation fields on the order of few Oe. The visualizers described in relation to exemplary illustrative non-limiting implementations are capable of detecting magnetic fields in the range of several Oe to several kOe through their perpendicular projections, and can detect fields in the range of sub-mOe to several Oe through their in-plane projections. Since magnetic field visualizers are preferably designed to detect spatially non-uniform fields, such fields usually have both perpendicular and in-plane projections. However, when the applied field (and through that the YIG film magnetization) has both in-plane and perpendicular projections, the effects caused by these projections may be indistinguishable in the visualizer arrangements described above. To distinguish both components of the YIG magnetization direction, a more complex visualizer embodiment can be used.

Figure 5C:
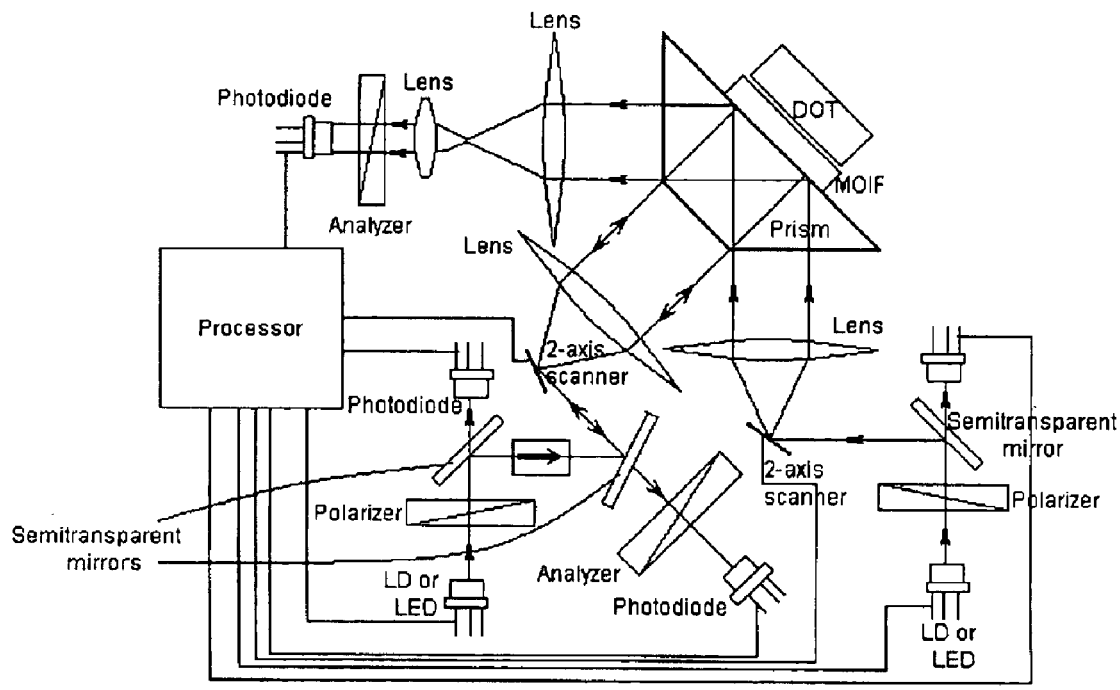
FIG. 5c is a schematic view of an illustrative wide field-of-view ultra-wide dynamic range scanning laser magnetic field visualizer.

According to a further exemplary non-limiting illustrative implementation, the advantageous visualizing system can utilize two at least partially separate optical paths to distinguish the contributions of in-plane and perpendicular magnetization projections. The exemplary non-limiting visualizer of the present embodiment is schematically shown in FIG. 5c. It provides a wide magnetic field dynamic range of $10^6$ to $5 \times 10^9$, depending on the complexity of the instrument, while maintaining either moderate spatial resolution over large visualizing area or high spatial resolution over moderate visualization area. The exemplary visualizer of the present embodiment uses two separate optical paths, the first of them having substantially the same structure as in the implementation illustrated in FIG. 4a, 4b or 5a). The first optical path is used to detect both in-plane and perpendicular components of the YIG magnetization vector through the tilted angle arrangement. The second optical path is used to detect only the perpendicular component of the YIG magnetization vector. By obtaining polarization rotation information from both paths, the in-plane and perpendicular components can be numerically separated.

An exemplary method of separation comprises the signal from the first optical path (which can utilize either a Malus or balanced arrangement of detection) taking the form $\Phi_1 = K_{11} \cdot \theta \cdot M_z + K_{12} \cdot \theta M_x$, and the signal from the second optical path taking the form $\Phi_2 = K_2 \cdot \theta \cdot M_z$. In these expressions, $\theta$ is the Faraday rotation per unit length of the YIG crystal; and $K_{11}$ and $K_{12}$ are the coefficients describing the sensitivity of the first path to the perpendicular and in-plane magnetization projections. These sensitivity coefficients depend on the particular visualizer implementation, i.e., on whether the prism is used, the type of prism used, the tilt angle, polarizer extinction, photodetector sensitivity, etc. $K_2$ is a similar sensitivity coefficient characterizing the second optical path. The coordinate system is introduced such that the Z-axis is normal to the YIG film and the Y-axis is normal to the plane of incidence. Since the coefficients $K_{11}$, $K_{12}$ and $K_2$ are approximately constant during the measurements and can be determined prior to measurements, the values of the magnetization projections can be obtained according to the simple formulas: $M_z = \Phi_2/(K_2 \cdot \theta)$ and $M_x = \Phi_1/(K_{12} \cdot \theta) - \Phi_2 \cdot K_{11}/(K_2 \cdot \theta)$. By determining separately the components of the magnetization, it is possible to achieve a wide dynamic range for the visualizer. If a DC bias magnetic field slightly exceeding the coercivity of the YIG film (typically in the range of 0.05–1 Oe) is applied along the Y-axis (i.e. in the direction of the in-plane easy axis), the YIG crystal will always be magnetized to saturation, so the magnitude of the magnetization vector can be preliminary measured. Hence, the third component of the magnetization vector can be also identified according to the formula $M_y = (M_s^2 - M_x^2 - M_z^2)^{1/2} = \{M_s^2 - [\Phi_2/K_2 \cdot \theta)]^2 - [\Phi_1/(K_{12} \cdot \theta) - \Phi_2 \cdot K_{11}/(K_2 \cdot K_{12} \cdot \theta)]^2\}^{1/2}$. This allows determination of full vector information on the YIG magnetization identification of the applied magnetic field vector's spatial distribution. Although various other minor modifications of the disclosed visualizer design may be suggested to those skilled in the art, it should be understood that we wish to embody within the scope of the present invention herein all such modifications as reasonably and properly come within the scope of our contribution to the art.

Visualizing Using Surface Plasmon Resonance MOIF Films

A Surface Plasmon Resonance (SPR)-based MOIF film was disclosed in application Ser. No. 60/442,539 filed Jan. 27, 2003 entitled "SURFACE CORRUGATION ENHANCED MAGNETO-OPTICAL INDICATOR FILM", incorporated herein by reference. Generally, a Surface Plasmon (SP) is a non-radiative surface wave that exists at the interface of a metal and a dielectric. See e.g. Raether H., *Thin Solid Films*, Vol. 28, (no. 1), July 1975. p.119. For the case of both media being isotropic, the properties of SPs are well known. See e.g. Raether H., *Thin Solid Films*, Vol. 28, (no. 1), July 1975. p.119, Agronovitch V. M. and Mills, D. L., *Surface polaritons*, North-Holland, 1982. The case of the SP at the interface of a magneto-optical medium (either metal or dielectric) is less well understood at present. Some special cases have been examined. See e.g., Wallis R. F. et al, *Physical Review B* (Solid State), Vol. 9, (no. 8), 15 Apr. 1974. p.3424, V. A. Kosobukin, *Journal of MMM* 153 (1996), 397–411. However, no general description of the phenomena has been developed. It is worthwhile to analyze SP propagation at the boundary of a magneto-optical medium.

In the case of a plane interface with both metal and dielectric media being isotropic, the SPs are TM-polarized. Their wave-vector satisfies the following dispersion equation:

$$k_{sp} = \frac{\omega}{c} \sqrt{\frac{\varepsilon_m \cdot \varepsilon_d}{\varepsilon_m + \varepsilon_d}},$$

where $\varepsilon_m$ and $\varepsilon_d$ are the dielectric permittivities of the metal and dielectric media respectively. In the case of one of the medial being gyrotropic, the dielectric permittivity is no longer a scalar, but rather a tensor:

$$\hat{\varepsilon} = \begin{pmatrix} \varepsilon & ig_z & -ig_y \\ -ig_z & \varepsilon & ig_x \\ ig_y & -ig_x & \varepsilon \end{pmatrix},$$

where g is the gyration vector. The gyration vector is collinear to the magnetization direction, and has a unique value for any given material and wavelength. The analytical problem of finding the dispersion relation and field amplitudes for the SP on the boundary of gyrotropic media with arbitrary orientation of the magnetization is complex and in general requires numerical calculations. However, this problem can be reduced to separate simpler problems when the magnetization of the magnetic medium is oriented perpendicular to the boundary, parallel to the SP propagation direction, and perpendicular to the SP propagation direction but parallel to the boundary.

Begin with the case of magnetization parallel to the SP propagation direction (designated "SP-Faraday geometry"). In this case, two solutions of Maxwell's equations exist for an electromagnetic wave traveling through the magneto-optical active medium. Assume circularly polarized waves (left-hand and right-hand) having the refractive indices of $n_\pm^2 = (\varepsilon \pm g)$, where $n_+$ corresponds to the right-handed wave and n to the left-handed wave. Let the magneto-optically-active medium be medium 1 and the medium on the other side of SP-supported boundary be medium 2 (it does not matter which of them is metal). In this case, we can introduce the following abbreviations for the wave vectors in both media:

$$k_{\pm z}^{(1)} = \sqrt{\varepsilon_\pm^{(1)} \cdot \left(\frac{\omega}{c}\right)^2 - k_{SP}^2}, \ k_z^{(0)} = \sqrt{\varepsilon^{(0)} \cdot \left(\frac{\omega}{c}\right)^2 - k_{SP}^2},$$

$$k_z^{(1)} = k_{\pm z}^{(1)}(|\overline{M}| = 0) = \sqrt{\varepsilon^{(1)} \cdot \left(\frac{\omega}{c}\right)^2 - k_{SP}^2}.$$

Figure 6A:
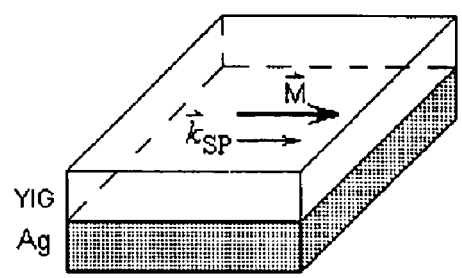
FIG. 6a shows a magnetization direction and Surface Plasmon (SP) wave vector orientation in "SPR (Surface Plasmon Resonance)-Faraday" geometry.

It should be noted that we chose the coordinate system in which the Z-axis is perpendicular to the boundary. The schematic illustrative drawing of such a geometry is given in FIG. 6a for the case of gyrotropic medium being YIG and the metal being Ag, although the description given here equally applies to any other case. In this example, the dispersion relation for the SP will have the form:

$$\varepsilon_+^{(1)} \cdot \frac{k_{+z}^{(1)} + k_z^{(0)}}{k_{+z}^{(1)}} + \varepsilon_-^{(1)} \cdot \frac{k_{-z}^{(1)} + k_z^{(0)}}{k_{-z}^{(1)}} + \varepsilon^{(0)} \cdot \frac{k_{+z}^{(1)} + k_{-z}^{(1)}}{k_z^{(0)}} = 2 \cdot \varepsilon^{(0)}$$

There is no simple analytical solution for such an equation. One must use numerical calculations to solve it. Such calculations show that in the case of a non-zero magnetization component in the direction of SP propagation, two solutions of the dispersion equation in the form of the left-handed and right-handed elliptical waves exist (i.e. the dispersion curve for the SP splits). Hence, in the case of at least one medium being gyrotropic, a TE component of the SP arises. This is unlike the case of the boundary between two isotropic media, where the SP is a pure TM wave. The ratio of the TE component to the TM component of the SP electric field vector (which can be attributed to the SP polarization) at the boundary will be:

$$\frac{E_{TE}^{SP}}{E_{TM}^{SP}} =$$

$$i \cdot \frac{k_{+z}^{(1)} - k_{-z}^{(1)}}{(k_{+z}^{(1)} + k_{-z}^{(1)}) + 2k_z^{(0)}} \approx i \cdot \frac{\left(\frac{\omega}{c}\right)^2}{4 \cdot k_z^{(1)}} \cdot \frac{\varepsilon_{+z}^{(1)} - \varepsilon_{-z}^{(1)}}{\varepsilon_z^{(0)} + \varepsilon_z^{(1)}} = i \cdot \frac{\left(\frac{\omega}{c}\right)^2}{4 \cdot k_z^{(1)}} \cdot \frac{2g}{k_z^{(0)} + k_z^{(1)}}.$$

The polarization of the SP is non-uniform in the direction across the boundary. The exact polarization profile depends on whether the metal or dielectric medium is gyrotropic.

Let us now consider the cases of the magnetization being perpendicular to the direction of the SP propagation. Two different cases can be considered. One case is when the magnetization is perpendicular to the boundary (as in perpendicular YIGs) and another is when the magnetization is parallel to the boundary (in-plane YIGs). As in the SP-Faraday case considered above, to find the solution of the boundary conditions one needs to first find the propagation constants of the electromagnetic waves (from Maxwell's equations) in both media. In the isotropic (nonmagnetic) media, the solution will be the same as in the case considered above. On the other hand, in a magneto-optically-active medium, two different solutions to Maxwell's equations exist in the form of two linearly polarized waves with polarizations orthogonal to each other and with refractive indices: $n\perp^2 = ((\epsilon^{(1)})^2 - g^2)/\epsilon^{(1)}$ and $n_\parallel^2 = \epsilon^{(1)}$. Hence, in the case of single boundary (both media are semi-infinite) the SP will still be a solution of the dispersion relation $$k_{sp} = \frac{\omega}{c} \sqrt{\frac{\varepsilon^{(0)} \cdot \varepsilon^{(1)}}{\varepsilon^{(0)} + \varepsilon^{(1)}}},$$

which wave-vector will be magnetization dependent through $\epsilon\perp^{(1)}$. In the case of magnetization being in-plane and perpendicular to the SP wave-vector, the polarization of the SP across the boundary will be TM, while in the case of the magnetization being perpendicular to the boundary the polarization of the SP will still be non-uniform.

Since SPs are non-radiative surface waves (i.e. $k_{SP} > k^{(0)}$, $k^{(1)}$), it is impossible to excite them on a single plane boundary between two media. To excite an SP, an additional moment is usually added to the light. One can add an additional moment through broken total internal reflection (Otto's and Kretchmann's prism-based arrangements), via a diffraction grating, or using any other known technique.

When the conditions are met of a wave vector of the incident light being matched to the wave-vector of the SP supported by some interface, the phenomenon known as a Surface Plasmon Resonance (SPR) occurs, which manifests itself in the modification of the reflected wave amplitude. See Raether H., *Thin Solid Films*, Vol. 28, (no. 1), July 1975. p.119, Agronovitch V. M. and Mills, D. L., *Surface polaritons*, North-Holland, 1982). The phase is also modified in the case of isotropic media. See e.g., Kochergin V. E. et al, *Kvantovaya Elektronika*, Vol. 25, (no. 5), May 1998. p.457 (Translation: *Quantum Electronics*, May 1998, Vol. 28, (no. 5):444), Nikitin P. I. et al, *Sensors and Actuators B* (Chemical), Vol. B54, (no. 1–2), January 1999. p.43, Gigorenko A. N. et al, *Applied Physics Letters*, Vol. 75, (no. 25), December 1999. p.3917. Another feature of SPR is a strong enhancement of a local electromagnetic field of the lightwave near the SP-supporting boundary. This enhancement depends on the particular parameters of MOIF film structure and can be up to several orders of magnitude (in some special cases enhancement of the electromagnetic field as strong as 7 orders of magnitude has been observed).

In the case of the one of the SP-supported media being magneto-optically active, strong enhancement of polarization rotation has been observed. See e.g., Safarov V. I. et al, *Physical Review Letters*, Vol. 73, (no. 26), 26 Dec. 1994. p.3584-7, Kochergin V. E. et al, *JETP Letters*, Vol. 68, (no. 5), September 1998, p.400. The physical explanation of this effect is as follows: It is well known that a magnetic field has a direct effect on the spectrum of an atom or molecule, giving rise to a splitting and specific polarization of spectral lines and bands (Zeeman effect, 1896). In the case of the normal longitudinal effect (i.e., the magnetic field and direction of light propagation through the medium are collinear), the original unpolarized spectral line of frequency $\omega_0$ splits into two lines $\omega_0 - \Delta\omega$ and $\omega_0 + \Delta\omega$ symmetrically disposed about the central line. The two new lines are circularly polarized in opposite directions. The magnetic field thus has a direct effect on the frequency and intensity of the spectral lines and therefore on the polarizability of the molecules. For left handed circularly polarized waves, the medium has the absorption frequency $\omega_0 - \Delta\omega$, while for right-handed circularly polarized waves it has the absorption frequency $\omega_0 + \Delta\omega$. It follows that polarizabilities, and, through that, the complex refractive indices, of a medium placed in a magnetic field are different for right-handed and left-handed waves in a longitudinal direction. This leads to rotation of the plane of polarization of light traveling through such medium. Hence, the magneto-optical Faraday effect has a clear light-molecule interaction origin. The value of the Faraday rotation through a unit length of a medium placed in a magnetic field will thus be proportional to the "light-to-molecule interaction rate", which is proportional to the local value of the electromagnetic field of light in the location of the molecule. The MO effects (which are utilized by the apparatus and methods disclosed herein) are linear optical effects, i.e. the total polarization rotation of light traveling through, and reflected from, the MOIF film is independent of incident light intensity. Thus, when a magneto-optically active optical material is placed at the interface supporting the SPs, the local electromagnetic field near the interface will be strongly enhanced, causing an enhancement of the magneto-optical effects. In particular, polarization rotation of an electromagnetic wave reflected from the SP-supported boundary in the case of the magnetization being collinear to the SP-propagation direction will be proportional to the following term:

$$\left[\frac{\left(\frac{\omega}{c}\right)^2}{4 \cdot k_z^{(1)}} \cdot \frac{2g}{k_z^{(0)} + k_z^{(1)}} \cdot K_{SP}\right]^2$$

where $K_{SP}$ is a field-enhancement factor calculated at zero magnetization, which could be, as was described above, of several orders of magnitude.

To consider the SPR-caused enhancement of the magneto-optical effects quantitatively, one must consider the particular arrangements of SP excitation. To utilize SPR in magnetic field and/or electrical current visualization, the magneto-optically active medium can be YIG. Other materials can be employed as described in previous provisional patent application Ser. No. 60/442,539 filed Jan. 27, 2003 entitled "SURFACE CORRUGATION ENHANCED MAGNETO-OPTICAL INDICATOR FILM". Hence, the case of YIG considered here is illustrative and non-limiting.

Figure 7A:
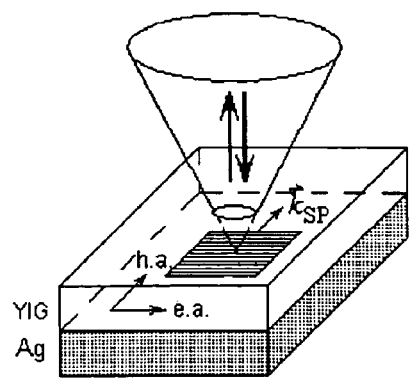
FIG. 7a is a schematic illustrative view of the orientation of incident light, diffraction grating and magnetic axes of the magneto-optical material for visualizing low in-plane fields.

YIG is a high refractive index material. For example, it exhibits a refractive index in the range from 2.2 to 2.45 for different YIG compositions in the visible spectral range. Hence, the prism-based arrangements for SP coupling, while possible using diamond prisms, are generally less economically favorable than grating-based arrangements (the illustrative diagrammatic drawing of which is shown in FIG. 7a), such as was utilized to investigate the SPR-based MO effects on a YIG/metal interface by Kochergin V. E. et al, *JETP Letters*, Vol. 68, (no. 5), September 1998, p.400.

To provide SPR conditions at normal incidence, the period of the corrugation can $$k_{sp} = \frac{\omega}{c}\sqrt{\frac{\varepsilon_m \cdot \varepsilon_d}{\varepsilon_m + \varepsilon_d}} = 2\pi l / \Lambda,$$

where $\omega$ is the frequency of light, $\Lambda$ is the period of grating, l is the diffraction order, $\varepsilon_m$ is the dielectric permittivity of the metal, and $\varepsilon_d$ is the dielectric permittivity of the YIG (in this particular illustrative case).

Figure 6B:
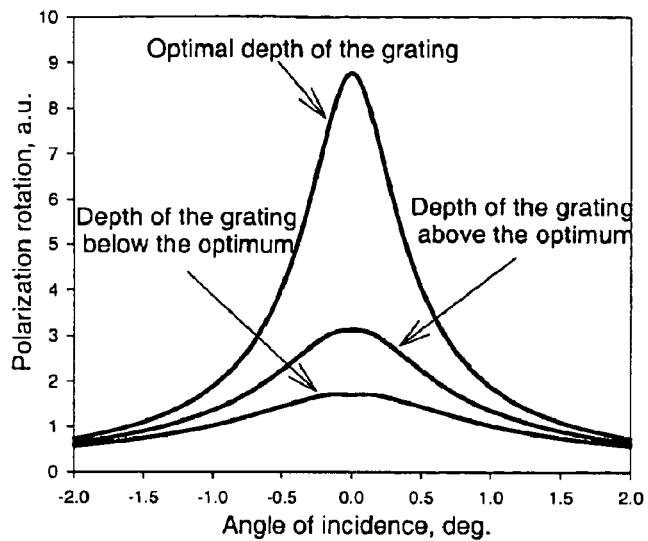
FIG. 6b is an exemplary illustrative plot of numerically calculated angular dependence of polarization rotation in the reflected light, for an exemplary grating-based SPR arrangement structure near SPR conditions for the case of magnetization being in-plane and parallel to the wave vector of the diffraction grating (i.e. direction perpendicular to the grooves)

For the conditions of first order diffraction (l=±1), $\Lambda$ should be in the range of 200–300 nm when utilizing illumination with wavelength around 630 nm. For second order diffraction it should be around 400–600 nm. The amplitude of the corrugation should be chosen to maximize the light coupling into the SP. See FIG. 6b showing numerically calculated polarization rotation as a function of the angle of incidence at 633 nm wavelength for MOIF structures of FIG. 7a with different strengths of SP coupling (through different corrugation amplitudes) when the magnetization of YIG is collinear to SP wave-vector (i.e. in plane and perpendicular to the grating grooves).

In this geometry, SP will cause polarization rotation when the magnetization of the YIG is collinear to the ksp at the conditions of normal incidence illumination. In other words, this occurs when the magnetization is in-plane and directed perpendicularly to the grating grooves (see FIG. 7a). Moreover, the overall value of the polarization rotation will be high. This can be used advantageously for visualization applications.

According to a further exemplary illustrative non-limiting implementation, the in-plane magnetization component can be detected (and through that the in-plane components of the external magnetic field) by utilizing surface plasmon excitation on the magneto-optic material interface. It can be accomplished through the diffraction grating fabricated at, or in close vicinity to it at normal incidence in a MOIF film used in a visualizing system. The magnetic anisotropy of the magneto-optical material can be of in-plane, single easy axis-type anisotropy with said easy axis being perpendicular to the SP propagation direction (i.e. parallel to the grating grooves) and a hard axis parallel to the SP propagation direction (i.e., perpendicular to the grating grooves). An in-plane DC bias magnetic field can be applied in the direction of the easy axis, having a value slightly exceeding the coercive force of the magneto-optical film in order to insure the uniform saturated magnetization of said film.

It should be noted that although YIG is thought to be the best material for many applications of the visualizer of a further exemplary illustrative non-limiting implementation, other magneto-optical materials can be used for SPR-enhanced MOIF films as well in the herein disclosed visualizer. As a nonlimiting example, the magneto-optical material can be metal such as Ni, Co, Fe, Fe/B alloy, Permalloy™ or any other magnetic material or multilayered material having sufficient Faraday rotation and suitable optical properties (a more detailed description can be found in the previous provisional patent application Ser. No. 60/442,539 filed Jan. 27, 2003 entitled "SURFACE CORRUGATION ENHANCED MAGNETO-OPTICAL INDICATOR FILM". Alternatively, the magneto-optical material can be a dielectric, such as, for example, an iron garnet type of material, hexaferrite, magnetic semiconductor or any other magneto-optically active and sufficiently transparent multilayer or other material known to those skilled in the art. The grating depth, wavelength and other parameters of such a structure should be chosen to maximize the coupling efficiency to the SP. This maximizes the polarization rotation and hence the response of the MOIF structure to the external stimulus to be detected or visualized (which can be an applied magnetic field and/or an electrical current for example).

Such a MOIF film structure has considerable advantages with respect to prior art MOIF structures. For example, if a YIG thin film is used in such a structure as a magneto-optical layer, such a MOIF film should provide detection of low in-plane magnetic fields with high spatial resolution, since the visualization will be done at normal incidence. In addition, the overall response can be up to an order of magnitude stronger due to the SP-enhanced polarization rotation effect analyzed above, thus making it possible to extend the low detection limit of the visualizer by the same factor. Moreover, SP-enhanced rotation is generated by the YIG film area within about 200 nm from the YIG/metal corrugated boundary for the 633 nm wavelength in one example arrangement, so the YIG film does not have to be thick to provide strong signals. This provides the opportunity to visualize small in-plane fields with very high spatial resolution (approximately equal to the YIG film thickness), when exceeding the optical resolution limit of about 200 nm for red light. This is possible due to the high refractive index of YIG.

Figure 6C:
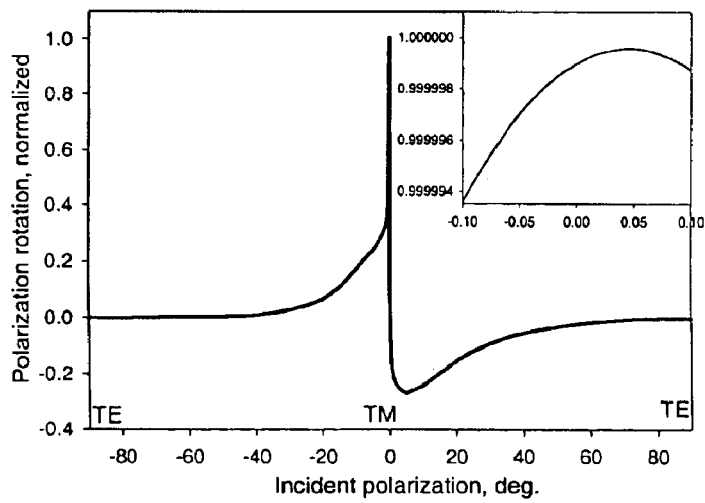
FIG. 6c is an exemplary illustrative plot of numerically calculated polarization rotation in the reflected light as a function of the polarization of the incident light, for an exemplary grating-based SPR arrangement structure near SPR conditions for the case of magnetization being in-plane and parallel to the wave vector of the diffraction grating (i.e. direction perpendicular to the grooves)

It is worthwhile to look at the dependence of polarization rotation of the SPR-enhanced MOIF on the polarization of incident light. FIG. 6c shows an example of numerically-calculated polarization rotation as a function of the polarization angle of normally incident, 633 nm wavelength light for the MOIF structure of FIG. 7a when the magnetization of the YIG is collinear to the SP wave vector (i.e., M is in-plane and perpendicular to the grating grooves). It follows from FIG. 6c that the MO polarization rotation is maximum around the TM polarization state of the incident light and close to zero around the TE polarization state of incident light. This property allows one to use the TE polarization of incident light for detecting perpendicular external magnetic fields and the TM polarization to detect low-to-very low in-plane fields. In order to do this, the magnetic anisotropy of the YIG should preferably be of the in-plane, single easy axis type and the grating grooves should be collinear to the easy axis direction as shown in FIG. 7a.

Figure 7B:
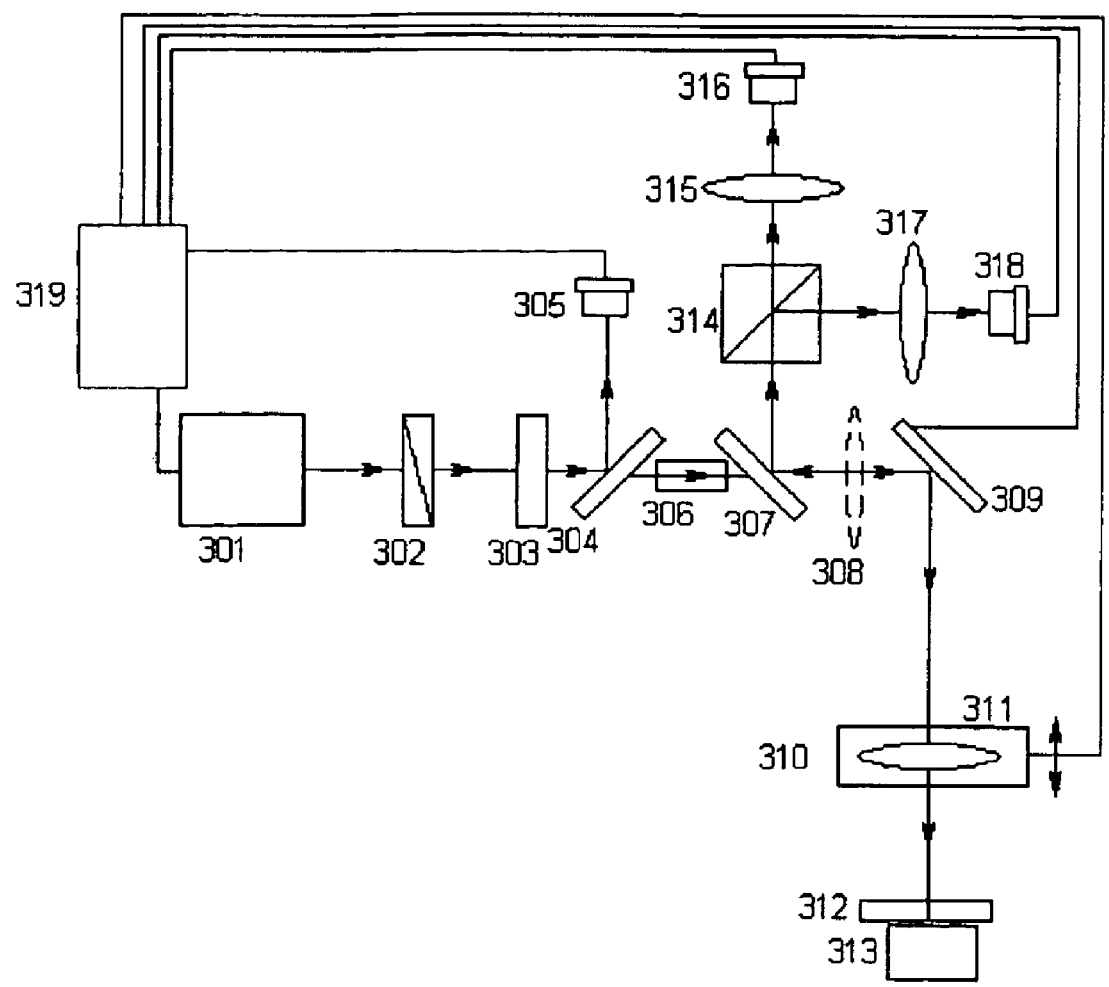
FIG. 7b is a schematic view of an illustrative exemplary wide field-of-view scanning laser magnetic field visualizer utilizing SP.

According to a further aspect of exemplary illustrative non-limiting implementations, the advantageous features of the MOIF film discussed above can be utilized in the non-limiting visualizer arrangement schematically shown in FIG. 7b. The collimated light beam from a laser source 301 passes through a polarizer 302. Laser source 301 can be a laser diode, a solid state laser, a gas laser or any other laser source known to those skilled in the art. Polarizer 302 transmits the first polarization component of the incident light and rejects the orthogonal polarization component. Polarizer 302 for example can be a Glan-Thompson polarizing cube, a sheet polarizer or any other polarizer known to those skilled in the art. Polarizer 302 in the example implementation should preferably be placed on a mechanical holder that can rotate said polarizer during the measurements. In one example arrangement, the mechanical holder has two (or more) fixed states—one state corresponds to an orientation of polarizer 302 so that the TM polarized light is incident on the MOIF film, and another state of the holder corresponds to an orientation of polarizer 302 so that the TE polarized light is incident on the MOIF film.

The beam polarized by polarizer 302 passes through the wave plate 303. Wave plate 303 can be, for example a half-wave plate used to adjust the polarization of the beam, thus improving the extinction of the visualizer, and, through that, the resolution and dynamic range. The wave plate 303 is optional. The beam is then directed to a semitransparent mirror 304, oriented at some angle with respect to the beam propagation direction. Mirror 304 reflects part of the incident beam to an intensity-monitoring detector 305 (connected to the processor 319), and transmits the rest of the light. The semitransparent mirror 304 can, for a nonlimiting illustrative example, reflect 1% of the beam to the photodetector and transmit 99%, or any other ratio of the reflected and transmitted portions can be used suitable for the particular visualizer application.

The transmitted beam then passes through an optional optical isolator 306, which passes light traveling to the forward direction and blocks the light traveling back. The light beam transmitted through the optical isolator 306 is then directed to a semitransparent mirror 307. Mirror 307 can, in a nonlimiting illustrative example, be oriented at some angle with respect to the beam propagation direction, to reflect part of the incident beam away from the optical path, and transmit the rest of the light.

The semitransparent mirror 307 can, for example, reflect 50% of the beam and transmit 50%, or any other ratio of reflected and transmitted portions can be used as suitable for the particular visualizer application.

In this example non-limiting arrangement, the transmitted portion of the beam then passes through an optional focusing lens 308 (with long focal distance) and is directed towards the two-dimensional angular-scanning system 309. Angular-scanning system 309 can be a single two-dimensional scanning mirror such as, as a nonlimiting illustrative example, MEMS-scanning mirror TM-8001 from MEMS Optical Corp. Alternatively, said system 309 can be a single two-dimensional scanning galvanic mirror, well known to those skilled in the art. As a further alternative, it may comprise an assembly of two single-axis mirrors with optical elements (such as lenses) between them, or any other 2-dimensional scanning optical assembly known to those skilled in the art.

The 2D angular scanning system 309 in the example implementation directs the light beam through the lens system 310 (placed on the movable processor-controlled translation stage 311) to MOIF 312, which film is in the close contact with the DUT 313. The beam can be focused on the YIG/metal grating interface of the MOIF 312 for high spatial resolution measurements. Alternatively, the beam can be collimated and directed at the MOIF 312 for wide area moderate spatial resolution visualization.

The beam reflected from the MOIF 312 will have the polarization altered differently for different positions of processor-controlled scanning system 319. Said difference in polarization indicates the magnetization distribution in the YIG layer and depends on the orientation of the polarizer 312. For example, if the polarizer 312 is oriented such that the incident beam has TM polarization, the reflected beam will have its polarization altered according to both projections of the YIG film magnetization, in-plane and perpendicular to the grating grooves and normal to the film surface. If the polarizer 312 is oriented such that the incident beam has a TE polarization, the reflected beam will have its polarization altered according to just the projection of the YIG film magnetization normal to the film. The reflected beam then travels back along the same optical path in the example non-limiting arrangement to the semitransparent mirror 307.

The portion of the beam transmitted through the semitransparent mirror 307 is then blocked by an optional optical isolator 306, while the reflected portion of the beam is directed to the detection unit 318. The detection unit 318 can, for example, be made in the balanced form as disclosed in relation to the above-disclosed exemplary illustrative non-limiting implementations (as shown in FIG. 7b), in the form of Malus' arrangement such as in FIGS. 3b and 4a, or using any other suitable configuration.

An optional wave plate (not shown) can be either a quarter wave plate or half wave plate, and can be disposed between the semitransparent mirror 307 and the detection unit 305 to improve the extinction of the visualizer.

For the balanced detection arrangement, the beam passes through a polarizing cube 314 or any other type of the polarizing beamsplitter known to those skilled in the art, which has sufficiently high extinction. The element 314 in one example implementation is oriented to pass polarizations that are orthogonal to the original polarization of the beam (i.e. only the component of polarization introduced due to the polarization rotation in YIG is passed) and to reject all other polarizations. Since the polarizer 302 in this example can have at least two states of orientation and said states are orthogonal to each other, there is no need to alter the orientation of the polarization cube 314 with respect to the beam if the original orientation of the cube 314 is chosen such as approximately 50% of the incident light is transmitted while 50% is reflected (i.e. the cube is oriented at a 45° tilt with respect to the polarizer 312).

In this exemplary arrangement, the transmitted beam is then directed by an optional lens 315 to a photodetector unit 316. Photodetector unit 316 provides a signal to the processor 319. Meanwhile, an optional lens 317 directs the reflected beam to the photodetector 318, providing another signal to the processor 319. The signal processing and control can be similar to that in the above exemplary illustrative non-limiting implementations with the following exception: instead of using two separate optical paths, two images corresponding to two states of the polarizer 302 are acquired through a single optical path. Although the speed of image acquisition may be about two times slower as compared to some of the previous embodiments, the visualizer of this aspect of the present embodiment is less expensive and can provide better spatial and magnetic field and/or electrical current resolutions and wider dynamic range.

Figure 2B:
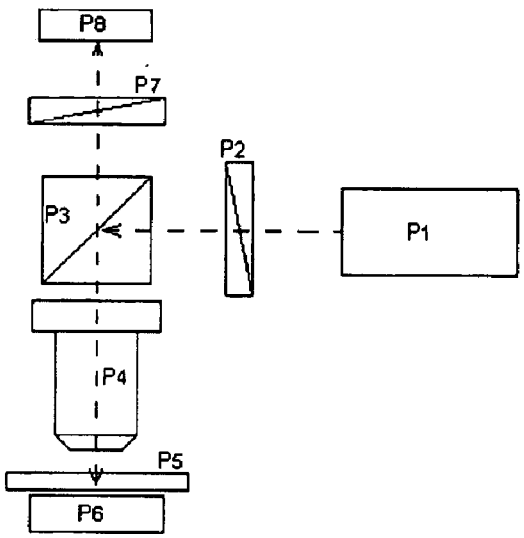
FIG. 2b is an exemplary schematic view of an exemplary prior art magnetic field visualizer utilizing an iron garnet film.
Figure 2C:
FIG. 2c is an exemplary microscope image of the magnetic field generated by the surface of the permanent magnet obtained in a prior-art visualizer of FIG. 2b with an iron garnet film having in-plane magnetic anisotropy.
Figure 8A:
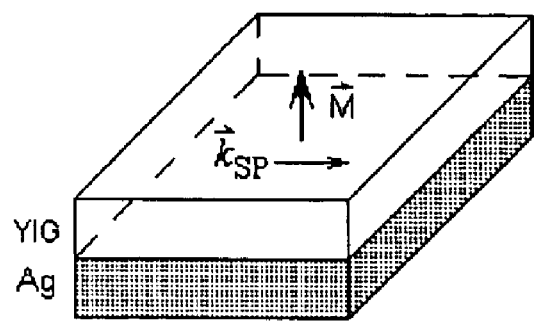
FIG. 8a shows a magnetization direction and SP wave vector orientation in an exemplary "perpendicular SPR geometry"
Figure 8B:
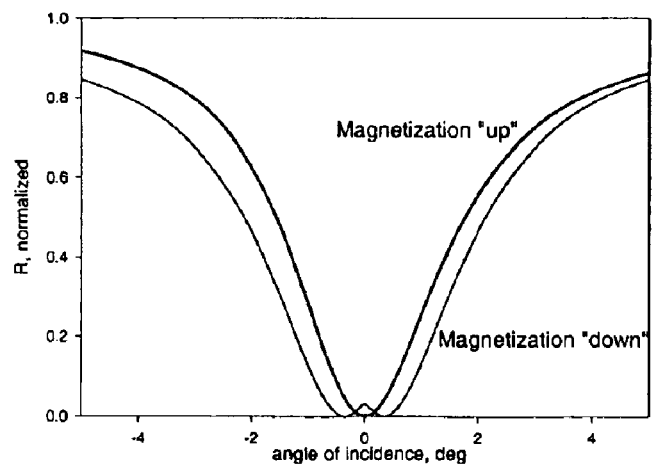
FIG. 8b is an exemplary plot of illustrative numerically calculated angular dependence of the reflectivity, for an exemplary grating-based SPR structure near the SPR conditions for the case of magnetization being perpendicular to the boundary of the magneto-optic medium for different directions of magnetization.

The embodiment of the SPR-enhanced MOIF film 312 disclosed above is based on the SPR-Faraday geometry. Perpendicular magnetization also causes modification of the SP wave-vector. See FIG. 8a for the illustrative non-limiting case of the SP excited at the boundary of YIG and Ag. This effect can also be utilized for the enhancement of the contrast in a MOIF visualizer constructed similarly to one shown in FIG. 2b. FIG. 8b shows an exemplary illustrative plot of numerically calculated angular dependence of the reflectivity for a grating-based SPR arrangement structure near the SPR conditions for the case of magnetization being perpendicular to the boundary of the magneto-optic medium for different directions of magnetization. It is shown in FIG. 8b that SPR manifests itself as a sharp dip in the angular or spectral dependence of reflectivity. The presence of a perpendicular component of the magnetization in YIG (for the MOIF film of FIG. 7a) causes changes in the ksp, thus shifting the angular (for fixed wavelength) or spectral (for fixed angle) positions of the reflection minimum. This gives rise to image contrast enhancement. According to a further aspect of exemplary illustrative non-limiting implementations, such an advantageous feature of the MOIF film can be utilized in the visualizers described herein or in any other modification of a visualizer known to those skilled in the art.

Example Non-Limiting Phase-Sensitive Visualizer

Figure 8C:
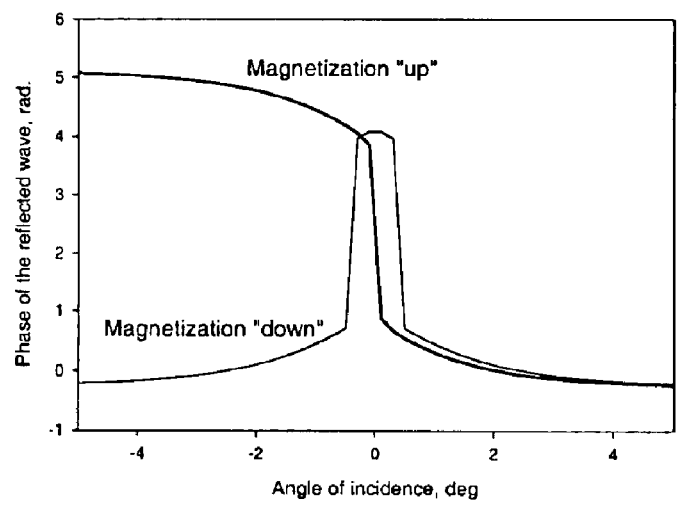
FIG. 8c is an exemplary illustrative plot of numerically calculated angular dependence of the phase of the reflected wave, for an exemplary non-limiting grating-based SPR structure near SPR conditions for the case of magnetization being perpendicular to the boundary of the magneto-optic medium for different directions of magnetization.

Even better enhancement of the image contrast and perpendicular magnetization component resolution can be achieved when phase-sensitive techniques are employed in the visualizer. As shown in Kochergin V. E. et al, *Kvantovaya Elektronika*, Vol. 25, (5), May 1998. p.457 (Translation: *Quantum Electronics*, May 1998, Vol. 28, (5), p. 444), Nikitin P. I. et al, *Sensors and Actuators B* (Chemical), Vol. B54, (1–2), January 1999. p.43, Gigorenko A. N. et al, *Applied Physics Letters*, Vol. 75, (no. 25), December 1999. p.3917, and Kochergin V. E. et al, *Kvantovaya Elektronika*, Vol. 25, (no. 9), September, 1998. p.857 (Translation: Quantum Electronics, September 1998, Vol. 28, (no. 9):835, phase variations of reflected light dependent on SPR-supported structural parameters can change much more abruptly than intensity can change. This is due to the almost Heaviside step-function behavior of the phase. Such effects also will take place if the parameter that is changing is the perpendicular magnetization component in YIG As an example, FIG. 8c shows an exemplary illustrative plot of numerically calculated angular dependences of the phase of the reflected wave in the situation illustrated in FIG. 8a. FIG. 8a relates to the case of a grating-based SPR structure arrangement near SPR conditions. Here, the magnetization is perpendicular to the boundary of the magneto-optic medium. The plots are presented for different directions of magnetization (toward and opposite to the substrate). Such advantageous features of the MOIF film can be utilized in the phase-sensitive magnetic field and/or electrical current visualizer design.

Figure 8D:
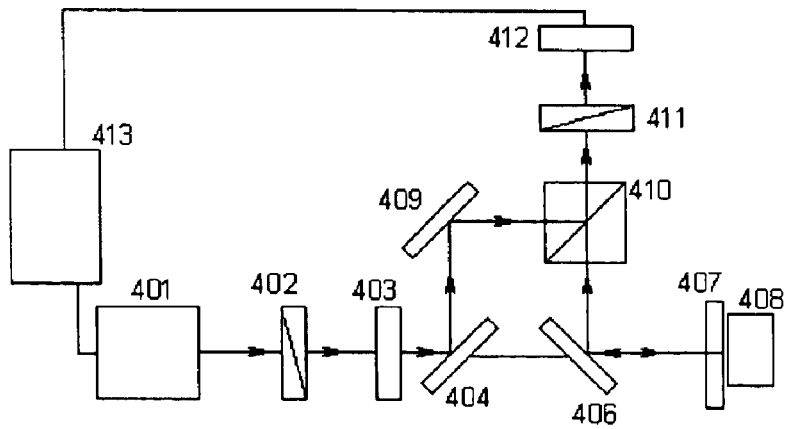
FIG. 8d is a schematic view of an illustrative non-limiting wide field-of-view magnetic field visualizer utilizing interferometry.
Figure 8E:
FIGS. 8e–g are exemplary numerically calculated SPR-interference images of the magnetic body with different strengths of perpendicular magnetic fields generated by it: No field (8e), small field (8f), and strong field (8g)
Figure 8F:
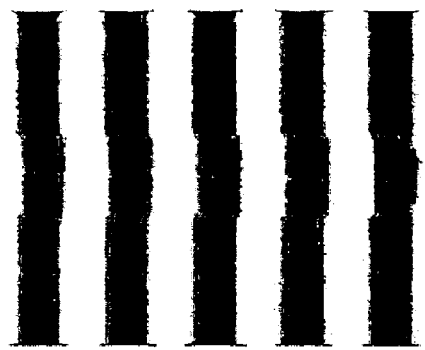
Figure 8G:
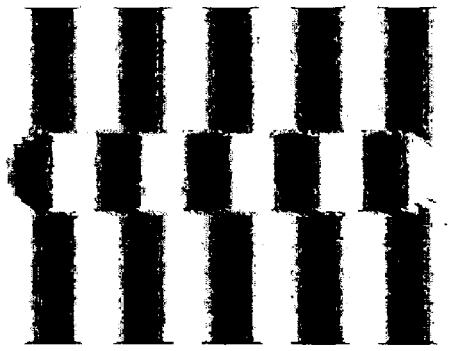

According to a further exemplary illustrative non-limiting implementation, the phase-sensitive visualizer can utilize an exemplary Mach-Zender interferometer arrangement, as shown in FIG. 8d. In this example non-limiting embodiment, a light beam provided by a laser light source 401 is collimated, expanded (with a lens system, not shown in the drawing), and homogenized with, for example, a spatial filter in the form of a pinhole or by any other means known to those skilled in the art. Laser source 401 can be a laser diode, solid state laser, gas laser or any other laser source known to those skilled in the art, preferably having sufficient coherence length for interferometry. The beam passes through a polarizer 402, which transmits the first polarization component of the incident light and rejects the orthogonal polarization component. Polarizer 402 can for example be a Glan-Thompson polarizing cube, a sheet polarizer or any other polarizer known to those skilled in the art. The beam then passes through a wave plate 403. Wave plate 403 can be, for example, a half-wave plate that is used to adjust the polarization, phase and ellipticity of the beam—thus improving the extinction (and, through that, the resolution and dynamic range) of the visualizer. The wave plate 403 is optional.

In the exemplary arrangement, the beam is next directed to a semitransparent mirror 404. Mirror 404 is preferably oriented at some angle with respect to the beam propagation direction. Mirror 404 divides the incident beam into two different beams, a sampling beam and a reference beam. The semitransparent mirror 404 can, for example, reflect 40% of the beam as the reference beam and transmit 60% as the sampling beam, or any other ratio of the reflected and transmitted portions can be used as suitable for the particular visualizer and/or application.

The sampling beam is directed to a semitransparent mirror 406 oriented at an angle with respect to the beam propagation direction. Mirror 406 reflects part of the incident beam away from the optical path, and transmits the rest of the light. The semitransparent mirror 406 can, for example, reflect 50% of the beam and transmit 50%, or any other ratio of reflected and transmitted portions can be used suitable for the particular visualizer implementation. The transmitted portion of the beam is then, in this non-limiting example, directed to the MOIF 407. Film 407 is in close contact with the DUT 408. The MOIF 407 can be similar to one disclosed above in connection with FIG. 3b, or it could be similar to that disclosed in previous provisional patent application Ser. No. 60/442,539 filed Jan. 27, 2003 entitled "SURFACE CORRUGATION ENHANCED MAGNETO-OPTICAL INDICATOR FILM", or any other suitable film or other magneto-optical medium can be used. In one exemplary arrangement, the beam can be focused on the YIG/metal grating interface of the MOIF 407 with a microscope objective or lens (not shown in the drawing) for high spatial resolution measurements. Alternatively, the beam can be directed to the MOIF 407 as is (i.e., expanded and collimated) for wide area, low-to-moderate spatial resolution visualization.

The light beam reflected from the MOIF film 407 will have the polarization, intensity and phase altered differently in different parts of the beam according to the magnetization distribution in the YIG layer. The reflected beam is then directed by the semitransparent mirror 406 to the cube beamsplitter 410, which combines it with the reference beam. Combined reference and sampling beams are then directed to the polarizer 411, which insures maximal contrast of the interference pattern. The angle at which both beams are combined (which determines the spatial frequency of the interference fringes) can be defined by the orientations of the mirror 409 and semitransparent mirror 404. The difference in length of reference and sampling beam paths should preferably, in one non-limiting arrangement, be below the coherence length of the laser source 401 to insure good contrast of the interference pattern.

After the polarizer 411, the interfering beams are directed to the CCD, CMOS or other 2D sensor array 412. Additional lens or lens system(s) (not shown) can be used between the polarizer 411 and detector array 412 to match the beam size to the size of said array 417. It should be noted that the Mach-Zender-based visualizer arrangement described here is an exemplary non-limiting illustrative embodiment. Other interferometric arrangements known to those skilled in the art can be used for phase-sensitive visualization.

Numerically calculated interference patterns obtainable with a phase-sensitive visualizer such as shown in FIG. 8d are presented in FIGS. 8e-h. Note that the contrast between the bright and dark interference fringes is independent of the YIG Faraday coefficient.

Exemplary Moif Film Configurations

Figure 9:
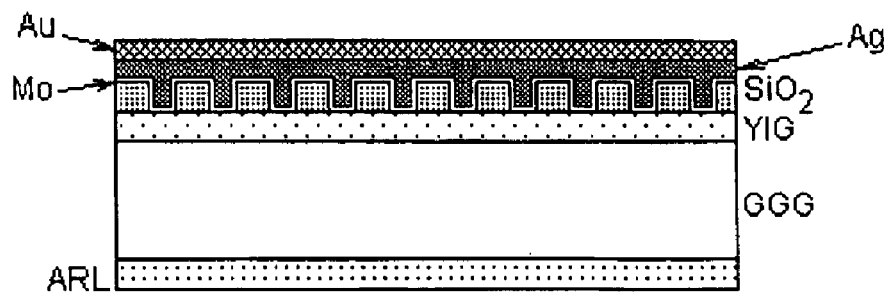
FIG. 9 is a schematic view of an exemplary non-limiting SPR-based MOIF structure.

The MOIF structure 407 can be made in a variety of different ways as disclosed in previous provisional patent application Ser. No. 60/442,539 filed Jan. 27, 2003 entitled "SURFACE CORRUGATION ENHANCED MAGNETO-OPTICAL INDICATOR FILM". One exemplary non-limiting practical MOIF structure is shown in FIG. 9. Such a MOIF film comprises a thin (0.2 to 3 microns) YIG film of suitable composition grown on a GGG substrate having composition, orientation and lattice parameter(s) chosen to obtain the desired magnetic properties of the YIG film. An antireflection coating (which can be either a single-layer antireflection coating or multilayer antireflection coating) can be applied to the GGG side of the exemplary MOIF film. Thin corrugations (e.g., 20 to 200 nm in amplitude, depending on the diffraction order at which SP's will be excited and on the working wavelength) can be provided all the way through a layer of transparent material. The transparent material may, for example, comprise magnetron sputtered $SiO_2$ and can be placed on the YIG surface and coated by a thin (1–2 nm) "glue" layer which can be of Ni, Mo, Ti, Cr or any other material having superior adhesion. In one example arrangement, a thin Ag film (e.g., 30 to 200 nm) is then deposited on the top of the "glue" layer and coated by another e.g., 30 to 100 nm of Au layer for environmental protection. A hard coating such as diamond-like carbon can then be placed over the Au, or in place of it. Such a MOIF film design was found to be practical and is currently preferred for at least some applications.

The magnetic properties of YIG layer are essential for visualization. To understand the magnetic properties of YIG crystals, we can consider first what energies are contributing to the overall YIG film anisotropy. Below is a short list of the different energies with a brief explanation of each:

Exchange energy density, $E_x = A \cdot [(\nabla \alpha_1)^2 + (\nabla \alpha_2)^2 + (\nabla \alpha_3)^2]$, where A is the exchange parameter, determined by the interactions between different YIG sublattices, and $\alpha_1$, $\alpha_2$, $\alpha_3$ are the directional cosines of the orientation of the local magnetization.

Demagnetization energy density, $E_D$, which for the particular thin film YIGs used for MOIF can be approximated with good accuracy by $E_D = 2\pi M_s^2$ when the magnetization is oriented perpendicular to the films and 0 when it is in-plane ($M_s$ is the saturation magnetization of the YIG film). This energy corresponds to the effective demagnetizing field of $H_D = -4\pi M_s$, the magnetization directed into the plane of the film.

Magnetic field energy density $E_H = -M_s \cdot H = -M_s \cdot H \cdot \cos \theta$, where H is the applied field and $\theta$ is the angle between the applied field and the magnetization.

Magnetoelastic energy density $E_S$, which for (111) films is equal to $E_S(111) = 1/2 \lambda_{100} \sigma_0 + \lambda_{111} \sigma_0 (\alpha_1 \alpha_2 + \alpha_2 \alpha_3 + \alpha_3 \alpha_1)$, where $\lambda_{100}$ and $_{100}$ are the magnetostrictive coefficients of the film material and represent the strain that is induced in a YIG crystal when magnetized to saturation in the (100) and (111) directions, respectively and local stress in the film, $\sigma_0$ is equal to $\sigma_0 = E/(1-v) \cdot (a_0^s - a_0^f)/a_0$, where E is Young's modulus, v is the Poisson's ratio, $a_0^s$ and $a_0^f$ are the lattice parameters of the film and the substrate.

Growth anisotropy energy density $E_K^G = A \cdot (\alpha_1^2 \cdot \beta_1^2 + \alpha_2^2 \cdot \beta_2^2 + \alpha_3^2 \cdot \beta_3^2) + B \cdot (\alpha_1 \cdot \alpha_2 \cdot \beta_1 \cdot \beta_2 + \alpha_2 \cdot \alpha_3 \cdot \beta_2 \cdot \beta_3 + \alpha_3 \cdot \alpha_1 \beta_3 \cdot \beta_1)$, where $\beta_1$, $\beta_2$, $\beta_3$ are the direction cosines of the growth direction. For (111) films, $\beta_1 = \beta_2 = \beta_3 = 1/3^{1/2}$, i.e., $E_K^G = (A+B)/3 + B/3 \cdot (\alpha_1 \cdot \alpha_2 + \alpha_2 \cdot \alpha_3 \cdot \alpha_1)$. Simple uniaxial anisotropy with easy axis perpendicular to the film for (111) films occurs when A<0 and B<0.

Crystalline anisotropy energy density, $E_K^C = K_1 \cdot (\alpha_1^2 \cdot \alpha_2^2 + \alpha_2^2 \cdot \alpha_3^2 + \alpha_3^2 \cdot \alpha_1^2) + K_2 \cdot \alpha_1^2 \cdot \alpha_2^2 \cdot \alpha_3^2 + \ldots$. The coefficents $K_1$ and $K_2$ are constants for a given composition and can be either negative or positive depending on the YIG composition. These coefficients in principle define the direction of easy axis (or axes). For example, easy axes coincide with the cubic axes when $K_1 > 0$ and with the cubic diagonal when $K_1 < 0$, but with deviations when $K_2$ is sufficiently large compared to $K_1$.

Crystalline and growth anisotropy energy densities contribute to the anisotropy energy $E_K = E_K^C + E_K^G$. The uniaxial component of the anisotropy energy density is usually expressed as $E_K = K_u \cos^2 \phi$, where $\phi$ is the angle of orientation of the magnetization (i.e. of the easy axis of the film when no external field is applied) and the normal direction of the film. (111) orientation is given here as an illustrative non-limiting embodiment, but other film orientations can be used instead. In order to obtain an in-plane film, the demagnetization energy should generally exceed the anisotropy energy: $2\pi M_s^2 > K_u$. In at least some example embodiments, another useful parameter that can be introduced is the perpendicular saturation field $H_a$. This is the field that must be applied in the (111) direction to move the magnetization perpendicular to the film plane.

Each of the coefficients listed above can vary over a wide range depending upon the YIG and GGG compositions. These in turn can be controlled through the melt composition, liquid phase epitaxy (LPE) and other growth process parameters. This leads to the potential for creating many different types of anisotropies through tuning one or more growth parameters. Other methods of growth are also possible, such as ion assisted, ion beam deposition.

Figure 10A:
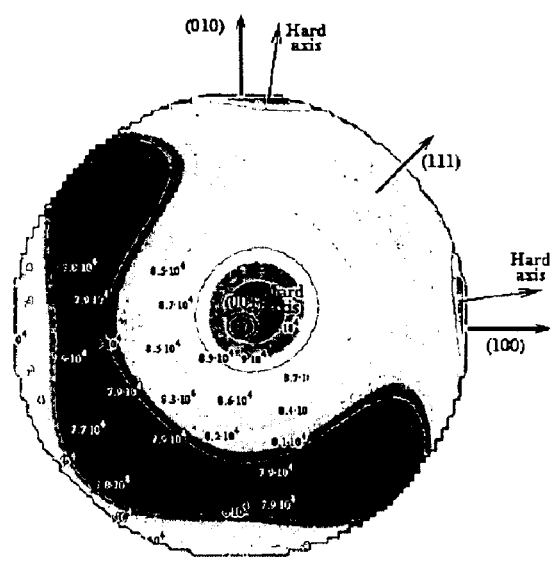
FIG. 10a–b are exemplary illustrative numerically calculated 3D plots of the magnetic energy in different iron garnets grown on (111)-oriented GGG substrates.
Figure 10B:
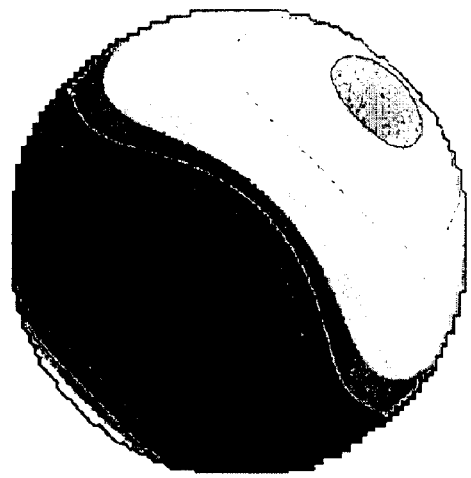
Figure 10C:
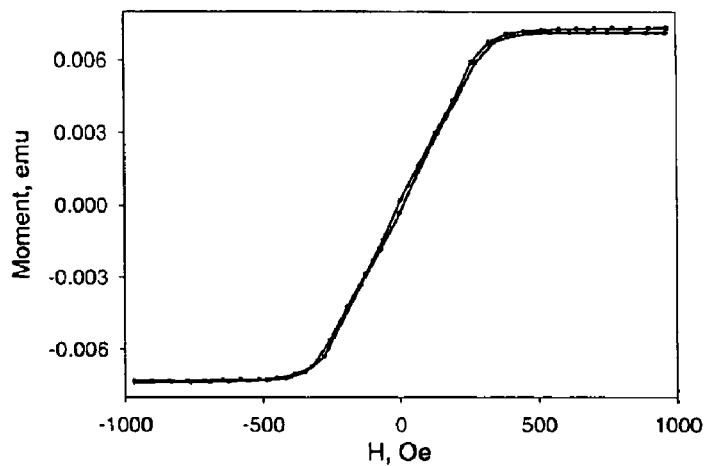
FIG. 10c shows an experimentally measured dependence of the magnetic moment of a typical in-plane iron garnet from the applied perpendicular magnetic field.
Figure 10D:
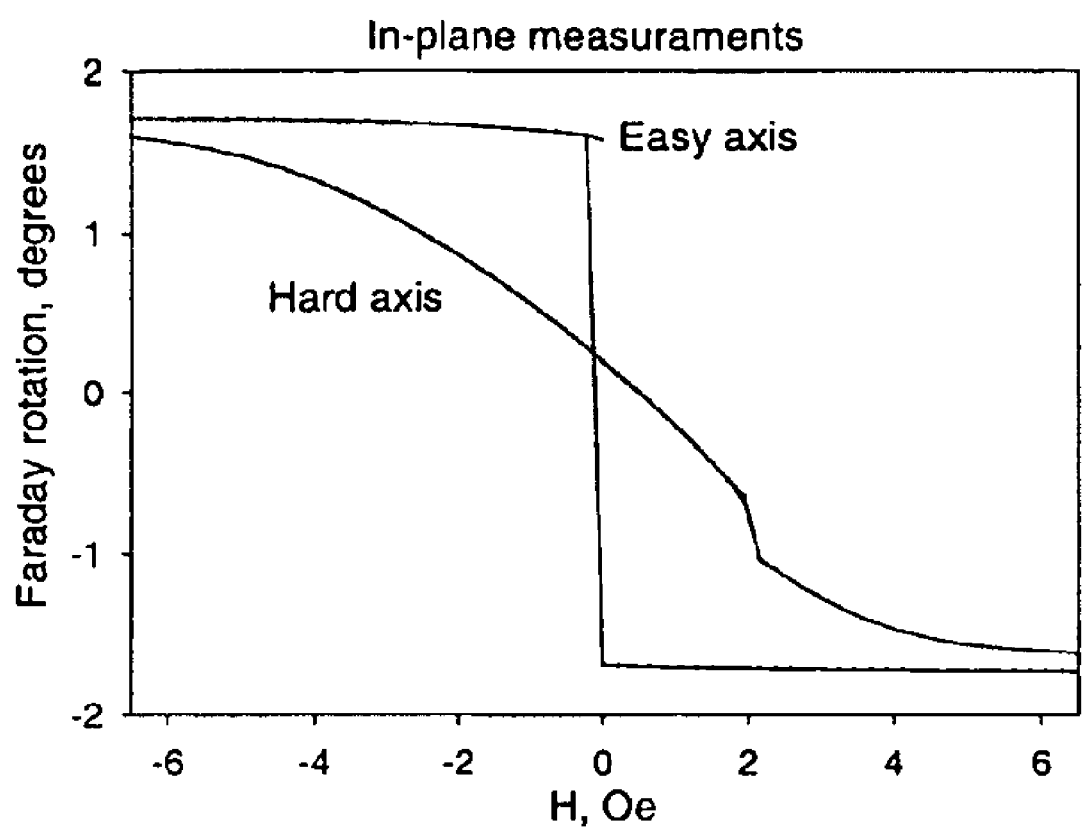
FIG. 10d shows the experimentally measured dependences of the Faraday rotation as functions of the applied in-plane magnetic fields for the easy and hard axes directions.

Example 3D plots of numerically calculated magnetic energy in different (111) iron garnets are given in FIGS. 10a and 10b. FIG. 10a shows the easy axes tilted with respect to the plane of the film and the hard axes slightly tilted from the (100), (010) and (001) directions. This is the case of pure cubic anisotropy. Another common type of magnetic anisotropy in thin film YIGs is shown in FIG. 10b, where a single easy axis lies in the plane or close to the plane of the film. Such an anisotropy may be preferred for MOIF structures used in the different embodiments. An exemplary experimental plot of the magnetic moment of such a film as a function of the applied perpendicular field is presented in FIG. 10c. Example plots of Faraday rotation as a function of the in-plane magnetic field applied along the hard and easy axes are shown in FIG. 10d. The very low coercivity and two orders of magnitude difference in the in-plane hard axis and perpendicular saturation field are clearly illustrated.

It is another goal to provide a method of acquiring the vector information on the magnetic field distribution on the plane of the magneto-optical indicator film using visualizers of the above implementations. According to a further exemplary illustrative non-limiting implementation:

The MOIF visualizing system such as described in relation to a further exemplary illustrative non-limiting implementation including the MOIF is provided.

a DC bias magnetic field slightly exceeding the coercivity of the MOIF is applied along the direction of the in-plane easy axis (Y axis), so the MOIF is magnetized to saturation The magnitude of the magnetization at the saturation of the MOIF is measured at the temperature at which the actual visualization will be performed and prior to such visualization.

The characteristic visualizing system coefficients $K_{11}$, $K_2$ and $K_{12}$ (the description of said coefficients is given previously in relation to exemplary illustrative non-limiting implementations discussed above) are predetermined by a calibration run on a special calibration sample.

the Faraday rotation per unit length of the MOIF at a wavelength of the illumination source of visualizing system is predetermined at the temperature of the actual visualization;

The magnetization curves of the MOIF when saturated by said DC bios magnetic field are obtained preliminary in a calibration run in the all three directions (perpendicular to the film, in-plane along hard axis and in-plane along easy axis).

The two dimensional arrays or data are generated for both paths of the visualizing system: $\Phi_1^{i,j}$ and $\Phi_2^{i,j}$.

The local vectors of magnetization of the MOIF film are determined according to the following formulas: $M_z^{i,j}=\Phi_2^{i,j}/(K_2\cdot\theta)$; $M_x^{i,j}=\Phi_1^{i,j}/(K_{12}\cdot\theta)--\Phi_2^{i,j}\cdot K_{11}/(K_2\cdot K_{12}\cdot\theta)$; $M_y^{i,j}=[M_s^2-(M_x^{i,j})^2-(M_z^{ij})^2]^{1/2}=(M_s-[\Phi_2^{i,j}/(K_2\cdot\theta)]^2-[\Phi_1^{i,j}/(K_{12}\cdot\theta)-\Phi_2^{i,j}\cdot K_{11}/(K_2\cdot K_{12}\cdot\theta)]^2\}^{1/2}$.

The vector information on the external magnetic field is determined according to the distribution of the MOIF film magnetization vector found and known from calibration magnetization curves.

By following these steps the quantitative vector information on the 2D distribution of the external magnetic field originated by the DUT can be extracted.

According to a further exemplary illustrative non-limiting implementation:

the MOIF visualizing system such as described in relation to the illustrative exemplary implementations disclosed above including the MOIF film is provided.

a DC bias magnetic field slightly exceeding the coercivity of the MOIF film is applied along the direction of the in-plane easy axis (Y axis), so the MOIF film is magnetized to saturation The magnitude of the magnetization at the saturation of MOIF film is predetermined at the temperature at which the actual visualization will be performed.

The characteristic visualizing system coefficients $K_{11}$, $K_2$ and $K_{12}$ (the description of said coefficients is given previously in relation to a further exemplary illustrative non-limiting implementation) are predetermined by a calibration run on a special calibration sample.

the polarization rotation per unit length of the MOIF at a wavelength of the illumination source of visualizing system is predetermined at the temperature of the actual visualization;

The magnetization curves of the MOIF when saturated by said DC bios magnetic field are obtained preliminary in a calibration run in the all three directions (perpendicular to the film, in-plane along hard axis and in-plane along easy axis).

The two dimensional arrays or data are generated for both polarization states (TE and TM) of the polarizer in the visualizing system: $\Phi_1^{i,j}$ and $\Phi_2^{i,j}$.

The local vectors of magnetization of the MOIF film are determined according to the following formulas: $M_z^{i,j}=\Phi_2^{i,j}/(K_2\cdot\theta)$; $M_x^{i,j}=\Phi_1^{i,j}/(K_{12}\cdot\theta)-\Phi_2^{i,j}\cdot K_{11}/(K_2\cdot K_{12}\theta)$; $M_y^{i,j}=[M_s^2-(M_x^{i,j})^2-(M_z^{ij})^2]^{1/2}=\{M_s^2-[\Phi_2^{ij}/(K_2\cdot\theta)]^2-[\Phi_1^{i,j}/(K_{12}\cdot\theta)-\Phi_2^{i,j}\cdot K_{11}/(K_2\cdot K_{12}]\theta)]^2\}^{1/2}$.

The vector information on the external magnetic field is determined according to the distribution of the MOIF film magnetization vector found and known from calibration magnetization curves.

By following these steps the vector quantitative information on the 2D distribution of the external magnetic field originated by the DUT can be extracted.

Although the invention has been described and illustrated with respect to the exemplary embodiments thereof, it should be understood by those skilled in the art that the foregoing and various other changes, omissions and additions may be made without departing from the scope of the invention.

We claim:

1. An optical system for imaging a two-dimensional distribution of a magnetic field, comprising:
   a light source providing light;
   a polarizer disposed to polarize said light and produce linearly polarized light;
   a magneto-optical imaging film structure comprising a substrate, a light reflector and at least one film exhibiting magneto-optical polarization rotation in response to the applied magnetic field, said magneto-optical imaging film further having an in-plane single easy axis type of anisotropy;
   an optical illumination system that directs said polarized light toward said magneto-optical imaging film such that the light reaches said film at an angle with respect to the normal direction to the magneto-optical imaging film surface;
   an optical detector, disposed in the path of light reflected from magneto-optical imaging film, providing an electrical detection signal indicative of the spatial distribution of the power of said light; and
   a signal processor responsive to said electrical detection signal, for conversion of said electrical signal from the optical detector to quantitative information of the magnetization distribution of the magneto-optical imaging film, and through said processing, the extraction of quantitative information on the spatial distribution of the magnetic fields in the location of said magneto-optical imaging film.

2. The optical system of claim 1 wherein the light source comprises a light source chosen from the group consisting of a light emitting diode (LED), a superluminescent diode (SLD), a laser or a lamp.

3. The optical system of claim 1 wherein an optical collimation means is disposed after the light source to collimate the light.

4. The optical system of claim 1 wherein a band-pass filter is disposed along the path of the light after the light source.

5. The optical system of claim 1 wherein a half-wave plate is disposed along the path of the light after the light source and is further oriented to maximize the performance of said optical system.

6. The optical system of claim 1 wherein said optical illumination system comprises a lens system that is used to focus the light at a certain spot on the said magneto-optical imaging film.

7. The optical system of claim 1 wherein said optical illumination system comprises at least one lens system that is used to expand the light to illuminate a substantial part of the magneto-optical imaging film's surface.

8. The optical system of claim 1 wherein said angle at which light reaching the MOIF film is within 20 to 70 degrees from the normal to the film surface.

9. The optical system of claim 1 wherein a prism is disposed over the magneto-optical imaging film and is in immersion contact with said film to provide higher tilt of the beam with respect to the normal direction to the magneto-optical medium.

10. The optical system of claim 1 wherein an optical collimation means is disposed in the path of the light reflected from said magneto-optical imaging film.

11. The optical system of claim 10 wherein said collimation means comprises a lens or lens system.

12. The optical system of claim 1 wherein an optical polarization component is disposed along the path of the light reflected by the magneto-optical imaging film.

13. The optical system of claim 12 wherein said polarization component comprises a transmission-type polarizer which is oriented to maximize the linearity and the dynamic range of said optical system.

14. The optical system of claim 1 wherein said optical detector comprises a two-dimensional detector array, selected from the group consisting of a CCD camera and a CMOS camera.

15. The optical system of claim 1 wherein the magnetic field for which the spatial distribution is being identified is generated by electrical currents in the device-under-test.

16. An optical laser scanning system for imaging of two-dimensional distributions of magnetic fields, comprising:
    a laser light source providing light;
    an optical beam-scanner;
    an optical illumination system that directs said light toward the magneto-optical imaging film structure so the light reaches said film at an angle with respect to the normal direction to the magneto-optical imaging film surface;
    said magneto-optical imaging film structure comprising a substrate, a light reflector and at least one film exhibiting magneto-optical polarization rotation in response to the applied magnetic field, said magneto-optical imaging film further having an in-plane single easy axis type of anisotropy;
    a polarizer disposed along the path of the light reflected from said magneto-optical imaging film;
    an optical detector, disposed in the path of light reflected from magneto-optical imaging film after said polarizer, providing an electrical detection signal indicative of the power of said light; and
    a signal processor responsive to said electrical detection signal, for conversion of said electrical signal from an optical detector into quantitative information of the magnetization distribution of the magneto-optical imaging film and through that the extraction of quantitative information about the spatial distribution of the magnetic fields in the location of said magneto-optical imaging film.

17. The optical laser scanning system of claim 16 wherein an optical collimation means is disposed after the laser source in order to further collimate the light.

18. The optical laser scanning system of claim 16 wherein a wave plate is disposed along the path of the light after the laser source and is oriented to maximize the performance of said optical system.

19. The optical laser scanning system of claim 18 wherein said wave plate is selected from the group consisting of a quarter-wave plate and a half-wave plate.

20. The optical laser scanning system of claim 16 wherein said optical beam-scanner comprises an angular scanning mirror system arranged to scan the two-dimensional magneto-optical imaging film.

21. The optical laser scanning system of claim 16 wherein said optical beam-scanner comprises a pair of one-dimensional angular scanning mirror.

22. The optical laser scanning system of claim 16 wherein an optical beam-splitting means is disposed along the light path between the laser source and the beam-scanner in order to redirect a portion of the light out of the main optical path towards a reference photodetector.

23. The optical laser scanning system of claim 22 wherein said photodetector provides an electrical signal to the signal processing means indicative of the power of light from the laser for the purpose of an optical power reference signal.

24. The optical laser scanning means of claim 16 wherein said optical illumination system comprises a lens system that is used to focus the light at a specific spot on the said magneto-optical imaging film.

25. The optical laser scanning means of claim 16 wherein said optical illumination system comprises a lens system that is used to control of an angle of incidence of a scanned beam on magneto-optical imaging film and further means provided to mechanically adjust the position of said lens to illuminate a substantial part of the magneto-optical imaging film's surface in a single scan.

26. The optical laser scanning means of claim 16 wherein said angle at which light reaches the MOIF is within 20 to 70 degrees from the normal to the MOIF surface.

27. The optical laser-scanning system of claim 16 wherein at least one of the lenses in the illumination system is disposed on a computer processor controlled, mechanically movable stage to provide active focal-spot adjustment.

28. The optical laser scanning means of claim 16 wherein the prism is disposed over the magneto-optical imaging film and is in immersion contact with said film to provide greater tilt away from the normal to the surface of the beam with respect to the normal direction in the magneto-optical medium.

29. The optical laser scanning system of claim 16 wherein a collimation means is disposed in the path of the light reflected from said magneto-optical imaging film.

30. The optical laser scanning system of claim 29 wherein said collimation means comprises a lens or lens system.

31. The optical laser-scanning system of claim 16 wherein an optical polarization component is disposed along the path of the light reflected by the magneto-optical imaging film.

32. The optical laser-scanning system of claim 31 wherein said polarization component comprises a transmission-type polarizer which is oriented to maximize the linearity and the dynamic range of said optical system.

33. The optical laser-scanning system of claim 16 wherein said polarizer comprises a transmission-type polarizer which is oriented to maximize the linearity and the dynamic range of said optical system, and further comprising a wave plate disposed along the path of the light reflected by the magneto-optical imaging film and before said polarization component that is oriented to maximize the performance of said optical system.

34. The optical laser scanning system of claim 33 wherein said wave plate is selected from the group consisting of a quarter-wave plate and a half-wave plate.

35. The optical laser scanning system of claim 16 wherein said polarizer comprises a polarization cube beam splitter adjusted to split the beam into two beams with orthogonal polarizations, approximately at 45 degrees to the polarization of the light incident on the magneto-optical film.

36. The optical laser-scanning system of claim 35 wherein the optical detector comprises two photodetectors disposed in the paths of the two beams resulting from said polarization beam-splitter.

37. The optical laser-scanning system of claim 16 wherein the laser light is amplitude modulated at a non-zero frequency by either direct modulation or by employing an external optical modulator disposed along the light path between the laser source and said magneto-optical imaging film.

38. The optical laser-scanning system of claim 37 wherein signal detector is incorporated to perform demodulation of said electrical signal from the photodetectors at the frequency of modulation.

39. The optical laser-scanning system of claim 16 wherein magnetic field which spatial distribution is being identified is generated by the electrical currents in the device-under-test.

40. An optical dual-path system for imaging a two-dimensional distribution of magnetic fields, comprising:
a magneto-optical imaging film comprising a substrate, at least one film exhibiting magneto-optical polarization rotation in response to an applied magnetic field and having in-plane single easy axis type of anisotropy and a light reflector,
two optical paths with each of said paths comprising
a light source providing light;
a polarizer disposed to polarize said light, producing linearly polarized light;
an optical illumination system in each path that directs said polarized light toward the magneto-optical imaging film such that the light reaches said film at an angle with respect to the normal direction to the magneto-optical imaging film surface for the first of said optical paths and in the normal direction to the magneto-optical imaging film surface for the second of said optical paths;
an optical detector, disposed in the path of light reflected from magneto-optical imaging film, providing an electrical detection signal indicative of the spatial distribution of the power of said light;
a signal processor responsive to said electrical detection signals from both optical detectors corresponding to both optical paths, for conversion of said electrical signal from an optical detector into the quantitative information of the magnetization distribution of the magneto-optical imaging film and through that extracting the quantitative information on the spatial distribution of the magnetic fields in the location of said magneto-optical imaging film.

41. The optical system of claim 40 wherein the light sources are chosen from the group consisting of a light emitting diode (LED), a Superluminescent diode (SLD), a laser or a lamp.

42. The optical system of claim 40 wherein an optical collimation means is disposed after each light source to collimate the light in each of said optical paths.

43. The optical system of claim 40 wherein a band-pass filter is disposed along the path of the light from each light source in each of said optical paths.

44. The optical system of claim 40 wherein a half-wave plate is disposed along the path of the light from each light source and each half-wave plate is oriented to maximize the performance of said optical system in the respective optical path.

45. The optical system of claim 40 wherein said optical illumination system comprises a lens system that is used to focus the light at a specific spot on the said magneto-optical imaging film in each of said optical paths.

46. The optical system of claim 40 wherein said optical illumination system comprises a lens system in each of said optical paths for the purpose of expanding the light beams in order to illuminate a substantial part of the surface of the magneto-optical imaging film with each expanded beam.

47. The optical system of claim 40 wherein said angle at which light reaches the MOIF is within 20 to 70 degrees from the normal to the MOIF surface in the first of said optical paths.

48. The optical system of claim 40 wherein a prism is disposed over the magneto-optical imaging film and is in immersion contact with said film to provide a greater tilt away from the normal direction to the magneto-optical imaging film for the first of said optical paths while not affecting the direction of the second beam that is incident normal to the MOIF surface.

49. The optical system of claim 40 wherein a collimation means is disposed in each of said optical paths in the path of the light reflected from said magneto-optical imaging film.

50. The optical system of claim 49 wherein said collimation means comprises a lens or lens system.

51. The optical system of claim 40 wherein an optical polarization component is disposed in each of said optical paths along the path of the light reflected by the magneto-optical imaging film.

52. The optical system of claim 51 wherein said polarization component comprises a transmission-type polarizer that is oriented to maximize the linearity and the dynamic range of said optical system in each of said optical paths.

53. The optical system of claim 40 wherein said optical detection means comprises a two-dimensional detector array, selected from the group consisting of a CCD camera and a CMOS camera in each of said optical paths.

54. The optical system of claim 40 wherein the magnetic fields being imaged are generated by the electrical currents in the device-under-test.

55. An optical system for imaging of a two-dimensional spatial distribution of a magnetic field, comprising:
a light source providing light;
a polarizer disposed to polarize said light, producing linearly polarized light;
an optical illumination system that directs said polarized light toward the magneto-optical imaging film;
said magneto-optical imaging film structure comprising a substrate and a thin film indicator structure, said indicator structure applied to said substrate and comprising a plurality of thin-film layers disposed on said substrate, at least one of said layers being of magneto-optically (MO)-active material having predetermined magnetic properties including magnetic anisotropy, magnetization saturation value, coercive field value, preferably having in-plane single easy axis type of anisotropy and a known magneto-optical effect value; said indicator structure including an additional at least one of said layers having a thickness and/or refractive index modulated in a predetermined fashion; said indicator structure having at least one optical mode which is at least partially localized in said at least one MO-active layer or at one interface of said at least one MO-active layer; and said at least one optical mode which is at least partially localized in said one layer having modulated thickness and/or refractive index;

an optical detector, disposed in the path of light reflected from magneto-optical imaging film, providing an electrical detection signal indicative of the spatial distribution of the power of said light; and a signal processor responsive to said electrical detection signal, for conversion of said electrical signal from the optical detector into quantitative information about the magnetization distribution in the magneto-optical imaging film and through that the extraction of quantitative information about the spatial distribution of the magnetic fields in the location of said magneto-optical imaging film.

56. The optical system of claim 55 wherein the light source comprises a light source chosen from the group consisting of a light emitting diode (LED), a Superluminescent diode (SLD), a laser or a lamp.

57. The optical system of claim 55 wherein an optical collimation means is disposed after the light source to collimate the light.

58. The optical system of claim 55 wherein a band-pass filter is disposed along the path of the light after the light source.

59. The optical system of claim 55 wherein a half-wave plate is disposed along the path of the light after the light source and is further oriented to maximize the performance of said optical system.

60. The optical system of claim 55 wherein said optical illumination system comprises a lens system that is employed to focus the light at a specific spot on the said magneto-optical imaging film.

61. The optical system of claim 55 wherein said optical illumination system comprises a lens system that is used to control an angle of incidence of a scanned beam on magneto-optical imaging film and further means provided to mechanically adjust the position of said lens to illuminate a substantial part of the magneto-optical imaging film's surface in a single scan.

62. The optical system of claim 55 wherein the collimation means is disposed in the path of the light reflected from said magneto-optical imaging film structure.

63. The optical system of claim 62 wherein said collimation means comprises a lens or a lens system.

64. The optical system of claim 55 wherein an optical polarization component is disposed along the path of the light reflected by the magneto-optical imaging film.

65. The optical system of claim 64 wherein said polarization component comprises a transmission-type polarizer that is oriented in order to maximize the linearity and the dynamic range of said optical system.

66. The optical system of claim 55 wherein said optical detection means comprises a two-dimensional detector array, selected from the group consisting of a CCD camera and a CMOS camera.

67. The optical system of claim 55 wherein the magnetic field for which the spatial distribution is being identified is generated by electrical currents in the device-under-test.

68. The optical system of claim 55 wherein the incident and reflected light paths at least partially coincide.

69. The optical system of claim 68 wherein a semitransparent mirror is disposed along the path of the light between the light source and the magneto-optical imaging film in order to divert the light reflected from said magneto-optical imaging film structure into a separate optical path.

70. The optical system of claim 69 wherein polarizing means and detection means are disposed in said separate optical path.

71. The optical system of claim 55 wherein the polarizer that is disposed along the light path between the light source and the magneto-optical imaging film is capable of providing two different orthogonal polarizations of the transmitted light according to a command from said signal processor.

72. The optical system of claim 71 wherein said different states of polarization of the light beam are selected by means of mechanical rotation of said polarizing means around the axis that coincides with the path of transmitted light.

73. The optical system of claim 71 wherein a second polarizing means, disposed along the path of the light reflected by the magneto-optical imaging film structure, is provided with the capability of causing two different orthogonal polarizations of the transmitted light according to a command from said signal processor.

74. The optical system of claim 71 wherein the image of the magneto-optical imaging film is captured by the signal processor at different states of both polarizing means and the acquired images are processed to separate different magnetization projections at every point of the image.

75. The optical system of claim 55 wherein the illumination of the magneto-optical imaging film is performed by means of a laser scanning technique.

76. The optical system of claim 75 wherein said laser scanning technique employs a two-dimensional angular scanning mirror.

77. The optical system of claim 75 wherein said laser scanner employs a pair of one-dimensional angular scanning mirrors.

78. The optical system of claim 75 wherein at least one of the lenses in the illumination system is disposed on a signal processor-controlled, mechanically movable stage to provide active focal adjustment.

79. The optical system of claim 75 wherein the polarizer is disposed in the path of the light reflected from said magneto-optical imaging structure said polarizer comprises a transmission-type polarizer that is oriented to maximize the linearity and the dynamic range of said optical system.

80. The optical system of claim 79 wherein a wave plate is disposed along the path of the light reflected by the magneto-optical imaging film structure before said analyzer component and is oriented to maximize the performance of said optical system.

81. The optical system of claim 80 wherein said wave plate is selected from the group consisting of a quarter-wave plate and a half-wave plate.

82. The optical system of claim 75 wherein the polarizer is disposed in the path of the light reflected from said magneto-optical imaging structure, said analyzer polarizer comprising a polarization cube beam splitter adjusted to split the beam into two beams with orthogonal polarizations, approximately at 45 degrees to the polarization of the light incident on the magneto-optical film structure.

83. The optical system of claim 82 wherein an optical detector comprises two photodetectors disposed in the paths of each of the two beams created by said polarization beam-splitter.

84. The optical system of claim 75 wherein the laser light is amplitude modulated at a non-zero frequency by either direct modulation or by employing an external optical modulator disposed along the light path between the laser source and said magneto-optical imaging film structure.

85. The optical laser-scanning system of claim 84 wherein a signal processor performs demodulation of said electrical signals from the photodetectors at the frequency of modulation.

86. An optical interferometer system for the imaging of a two-dimensional distribution of a magnetic field, comprising:

a light source providing light a polarizer disposed to polarize said light, producing linearly polarized light;

an optical beam splitter dividing the beam into two spatially separate beams, a sample beam and a reference beam;

an optical illumination system that directs said sample beam toward the magneto-optical imaging film;

said magneto-optical imaging film comprising a substrate and a thin film indicator structure, said indicator structure applied to said substrate and comprising a plurality of thin-film layers disposed on said substrate, at least one of said layers being of magneto-optically (MO)-active material and having predetermined magnetic properties, including magnetic anisotropy, magnetization saturation value, coercive field value, preferably having in-plane single easy axis type of anisotropy; and a known magneto-optical effect value; said indicator structure including at least one of said layers having a thickness and/or refractive index modulated in a predetermined fashion; said indicator structure having at least one optical mode which is at least partially localized in said at least one MO-active layer or at one interface of said at least one MO-active layer; and said at least one optical mode which is at least partially localized in said one layer having modulated thickness and/or refractive index;

an optical combiner, combining the reference beam and sample beam reflected from said magneto-optical imaging film structure at an angle with respect to each other and with respect to the normal to the MOIF structure an optical polarizing means disposed in the path of the combined beam to provide means for selecting a polarization that maximizes the contrast of the interference patterns resulting from the combination of the sample and reference beams an optical detector, disposed in the path of the combined light from the sample and reference paths, providing an electrical detection signal indicative of the spatial distribution of the power of said light;

a signal processor responsive to said electrical detection signal, said signal processor converting said electrical signal from the optical detector into quantitative information characterizing the magnetization distribution of the magneto-optical imaging film, and through that the extraction of quantitative information about the spatial distribution of the magnetic fields in the location of said magneto-optical imaging film.

87. The optical interferometer system of claim 86 wherein the light source comprises a light source chosen from the group consisting of a light emitting diode (LED), a Superluminescent diode (SLD), a laser or a lamp.

88. The optical interferometer system of claim 86 wherein an optical collimator is disposed after the light source to collimate the light.

89. The optical interferometer system of claim 86 wherein a narrow band-pass filter is disposed along the path of the light after the light source.

90. The optical interferometer system of claim 86 wherein a half-wave plate is disposed along the path of the light after the light source and is oriented to maximize the performance of said optical system.

91. The optical interferometer system of claim 86 wherein said optical illumination system comprises a lens system that is employed to focus the light at a specific spot on the said magneto-optical imaging film.

92. The optical interferometer system of claim 86 wherein said optical illumination system comprises a lens system that is used to control of an angle of incidence of a scanned beam on magneto-optical imaging film and further means provided to mechanically adjust the position of said lens to illuminate a substantial part of the magneto-optical imaging film's surface in a single scan.

93. The optical interferometer system of claim 86 wherein a collimation means is disposed in the path of the light reflected from said magneto-optical imaging film structure.

94. The optical interferometer system of claim 93 wherein said collimation means comprises a lens or a lens system.

95. The optical interferometer system of claim 86 wherein said polarization component comprises a transmission-type polarizer.

96. The optical interferometer system of claim 86 wherein said optical detection means comprises a two-dimensional detector array, selected from the group consisting of a CCD camera and a CMOS camera.

97. The optical interferometer system of claim 86 wherein the magnetic field for which the spatial distribution is being quantified is generated by electrical currents in the device-under-test.

98. A method of imaging a two-dimensional distribution of magnetic field vectors:

providing an optical dual-path system consisting of a magneto-optical imaging film structure comprising a substrate, at least one film applied to said substrate and exhibiting magneto-optical polarization rotation in response to an applied magnetic field and having in-plane single easy axis type of anisotropy and an applied light reflector and further providing two optical paths with each of said paths comprising providing light from a light source;

polarizing said light to produce linearly polarized light;

directing said polarized light toward the magneto-optical imaging film so that the light reaches said film at some angle with respect to the normal direction to the magneto-optical imaging film surface for a first of said optical paths and at normal direction to the magneto-optical imaging film surface for a second of said optical paths;

generating an electrical detection signal indicative of the spatial distribution of the power of said light;

converting said electrical signal into quantitative information about the magnetization distribution of the magneto-optical imaging film, and through that the extraction of quantitative information on the spatial distribution of the magnetic fields in the location of said magneto-optical imaging film;

providing a pre-measured magnitude of the magnetization at the saturation of said magneto-optical imaging film at the temperature at which the actual imaging is to be performed;

providing a pre-determination of the characteristic optical system coefficients through a calibration procedure;

providing a pre-determination of the Faraday rotation per unit length of said magneto-optical imaging film at a wavelength of said light source and at the temperature at which the actual imaging to be performed;

providing and storing pre-determined magnetization curves of said magneto-optical imaging film in the directions perpendicular to the film, in-plane along the hard axis and in-plane along the easy axis by means of a calibration procedure;

providing and storing arrays of data obtained from said detection means corresponding to both optical paths in said optical dual-path system;

obtaining all components of the local vectors of magnetization of said magneto-optical imaging film at each point of measurement by means of signal processing of the recorded and stored data; and obtaining the spatial distribution of the external magnetic field vectors by means of signal processing of the recorded and stored data.

99. The method of imaging of claim 98 wherein a DC bias magnetic field, exceeding the coercivity of the said magneto-optical imaging film, is applied along the direction of the in-plane easy axis of said film, causing the said film to be magnetized to saturation.

100. A method of imaging of claim 99 wherein said pre-determined magnetization curves are measured when said DC bias magnetic field is applied to the film.

101. A method of imaging of claim 98 wherein the component of magnetization normal to the film is determined from said characteristic optical system's pre-determined coefficients corresponding to the second optical path, the pre-determined Faraday rotation per unit length of said magneto-optical imaging film and the stored data array from the second optical path.

102. A method of imaging of claim 98 wherein the in-plane component of magnetization collinear to the hard axis of the magneto optical imaging film is determined from said pre-determined characteristic optical system's coefficients corresponding to the first optical path, the pre-determined Faraday rotation per unit length of said magneto-optical imaging film, the stored data array from the first optical path and from the said pre-determined characteristic optical system's coefficients corresponding to the second optical path, the pre-determined Faraday rotation per unit length of said magneto-optical imaging film and the stored data array from the second optical path.

103. A method of imaging of claim 99 wherein the in-plane component of magnetization collinear with the magneto-optical imaging film's easy axis is determined from said pre-determined characteristic optical system's coefficients corresponding to the first optical path, the pre-determined Faraday rotation per unit length of said magneto-optical imaging film, the stored data array from the first optical path, from the said pre-determined characteristic optical system's coefficients corresponding to the second optical path, the pre-determined Faraday rotation per unit length of said magneto-optical imaging film, the stored data array from the second optical path and from the said pre-determined value of the saturated magnetization of said magneto-optical imaging film.

104. A method of imaging a two-dimensional distribution of magnetic field vectors:

providing an optical system for the imaging of a two-dimensional distribution of the magnitude of the magnetic field vector projections:

providing a magneto-optical imaging film, said magneto-optical imaging film comprising a substrate, a thin film indicator structure, said indicator structure applied to said substrate and comprising a plurality of thin-film layers disposed on said substrate, at least one of said layers being of magneto-optically (MO)-active material and having pre-determined magnetic properties including magnetic anisotropy, magnetization saturation value, coercive field value, preferably having in-plane single easy axis type of anisotropy; and a known magneto-optical effect value; said indicator structure including at least one of said layers having a thickness and/or refractive index modulated in a predetermined fashion; said indicator structure having at least one optical mode which is at least partially localized in said at least one MO-active layer or at one interface of said at least one MO-active layer; and said at least one optical mode is at least partially localized in said one layer having modulated thickness and/or refractive index; a light source providing light; a polarizer disposed to polarize said light, producing linearly polarized light with at least two states corresponding to TE and TM-polarized waves; an optical illumination system that directs said polarized light toward the magneto-optical imaging film; an analyzer disposed in the path of the light reflected by the magneto-optical imaging film structure with the two states associated with each of the TM and TE-polarized waves; an optical detection means, disposed in the path of light reflected from magneto-optical imaging film structure, providing an electrical detection signal indicative of the spatial distribution of the power of said light; signal processing means responsive to said electrical detection signal, for conversion of said electrical signal from an optical detection means to quantitative information about the magnetization distribution in the magneto-optical imaging film and through that the extraction of quantitative information about the spatial distribution of the magnetic fields in the location of said magneto-optical imaging film;

providing the pre-measured magnitude of the magnetization at saturation of said magneto-optical imaging film at the temperature at which the actual imaging is to be performed;

providing the pre-determination of the characteristic optical system coefficients by means of a calibration procedure;

providing the pre-determination of the Faraday rotation per unit length of said magneto-optical imaging film at a wavelength of said light source and at the temperature at which the actual imaging to be performed;

providing and storing the pre-determined magnetization curves of said magneto-optical imaging film in the directions perpendicular to the film, in-plane along the hard axis and in-plane along the easy axis by means of a calibration procedure;

providing and storing arrays or data obtained from said detection means at said two different states of polarizer and analyzer;

obtaining all components of the local vectors of magnetization of said magneto-optical imaging film at each point of measurement by means of mathematical processing of the recorded and stored data;

obtaining the spatial distribution of the external magnetic field vector by means of signal processing of the recorded and stored data by said signal processing means.

105. A method of imaging of claim 104 wherein a DC bias magnetic field exceeding the coercivity of the said magneto-optical imaging film is applied along the direction of the in-plane easy axis of said film, such that the said film is magnetized to saturation.

106. A method of imaging of claim 105 wherein said pre-determined magnetization curves are measured when said DC bias magnetic field is applied to the film.

107. A method of imaging of claim 104 wherein the component of magnetization normal to the film is determined from said pre-determined characteristic optical system's coefficients corresponding to the TE state of the polarizer and the TM state of the analyzer, pre-determined Faraday rotation per unit length of said magneto-optical imaging film and the stored data array from the said system's state corresponding to the TE state of polarizer and the TM state of analyzer.

108. A method of imaging of claim 104 wherein the in-plane component of magnetization collinear to the magneto optical imaging film's hard axis is determined from said pre-determined characteristic optical system's coefficients corresponding to the system's state associated with the TM state of polarizer and the TE state of analyzer, pre-determined Faraday rotation per unit length of said magneto-optical imaging film, the stored data array from the system's state corresponding to the TM state of polarizer and the TE state of the analyzer and from said pre-determined characteristic the optical system's coefficients corresponding to the system's state associated with the TE state of the polarizer and the TM state of the analyzer, the pre-determined Faraday rotation per unit length of said magneto-optical imaging film and the stored data array from the system's state corresponding to the TE state of the polarizer and the TM state of the analyzer.

109. A method of imaging of claim 105 wherein the in-plane component of magnetization collinear to the magneto optical imaging film's easy axis is determined from said pre-determined characteristic optical system's coefficients corresponding to the TM state of the polarizer and the TE state of the analyzer, the pre-determined Faraday rotation per unit length of said magneto-optical imaging film, the stored data array from the TM state of the polarizer and the TE state of the analyzer and from said pre-determined characteristic optical system's coefficients corresponding to the TE state of the polarizer and the TM state of the analyzer, the pre-determined Faraday rotation per unit length of said magneto-optical imaging film and the stored data array from the TE state of the polarizer and the TE state of the analyzer and from the said pre-determined value of the saturated magnetization of said magneto-optical imaging film.

110. An optical system for imaging of a two-dimensional distribution of the magnitude of the magnetic field vector projections, comprising:

a light source providing light a polarizer disposed to polarize said light, producing linearly polarized light;

an optical illumination system that directs said polarized light toward the magneto-optical imaging film such that the light reaches said film at an angle with respect to the normal direction to the magneto-optical imaging film surface;

said magneto-optical imaging film structure comprising a substrate, a light reflection means and at least one film exhibiting magneto-optical polarization rotation in response to the applied magnetic field, said magneto-optical imaging film further having a cubic axis type of anisotropy;

an optical detection means, disposed in the path of light reflected from the magneto-optical imaging film, providing an electrical detection signal indicative of the spatial distribution of the power of said light;

signal processing means responsive to said electrical detection signal, for conversion of said electrical signal from an optical detection means into quantitative information about the magnetization distribution in the magneto-optical imaging film and through that the extraction of quantitative information about the spatial distribution of the magnetic fields in the location of said magneto-optical imaging film.

* * * * *